United States Patent [19]

Pare, Jr. et al.

[11] Patent Number: 5,764,789

[45] Date of Patent: Jun. 9, 1998

[54] TOKENLESS BIOMETRIC ATM ACCESS SYSTEM

[75] Inventors: David Ferrin Pare, Jr.; Ned Hoffman; Jonathan Alexander Lee, all of Berkeley, Calif.

[73] Assignee: SmartTouch, LLC, Berkeley, Calif.

[21] Appl. No.: 722,629

[22] Filed: Sep. 27, 1996

Related U.S. Application Data

[63] Continuation-in-part of Ser. No. 442,895, May 17, 1995, Pat. No. 5,613,012, which is a continuation-in-part of Ser. No. 345,523, Nov. 28, 1994, Pat. No. 5,615,277.

[51] Int. Cl.$^6$ .................................................. G06K 9/00
[52] U.S. Cl. ............................................ 382/115; 382/224
[58] Field of Search ................. 340/825.34, 825.33, 340/825.31; 395/244, 241, 243; 380/21, 24; 902/26, 1, 2, 3, 4, 5, 6, 8, 9, 10, 12, 13, 22, 23, 24, 25, 27; 235/380, 375, 376, 379, 381, 382, 383, 382.5, 384, 385, 386; 382/115, 116, 117, 118, 119, 124, 128, 181, 190, 209, 224, 226, 227

[56] References Cited

U.S. PATENT DOCUMENTS

| | | | |
|---|---|---|---|
| 4,821,118 | 4/1989 | Lafreniere | 358/108 |
| 4,837,422 | 6/1989 | Dethloff et al. | 364/408 |
| 4,961,142 | 10/1990 | Elliott et al. | 364/408 |
| 4,993,068 | 2/1991 | Piosenka et al. | 380/23 |
| 4,995,086 | 2/1991 | Lilley et al. | 382/4 |
| 4,998,279 | 3/1991 | Weiss | 340/825 |
| 5,036,461 | 7/1991 | Elliott et al. | 364/408 |
| 5,054,089 | 10/1991 | Uchida et al. | 382/4 |
| 5,095,194 | 3/1992 | Barbanell | 235/379 |
| 5,109,427 | 4/1992 | Yang | 382/4 |
| 5,109,428 | 4/1992 | Igaki et al. | 382/5 |
| 5,144,680 | 9/1992 | Kobayashi et al. | 382/4 |
| 5,146,102 | 9/1992 | Higuchi et al. | 250/556 |
| 5,168,520 | 12/1992 | Weiss | 380/23 |
| 5,180,901 | 1/1993 | Hiramatsu | 235/380 |
| 5,191,611 | 3/1993 | Lang | 380/25 |
| 5,210,588 | 5/1993 | Lee | 356/71 |
| 5,210,797 | 5/1993 | Usui et al. | 382/4 |
| 5,222,152 | 6/1993 | Fishbine et al. | 382/2 |

(List continued on next page.)

OTHER PUBLICATIONS

Security Management V 37, n11 (Nov. 1993):17–19 Anderson, et al. American Society for Industrial Security 1993, "Security Works", Editor: Harowitz, Arlington, VA.

*Primary Examiner*—Leo H. Boudreau
*Assistant Examiner*—Bijan Tadayon
*Attorney, Agent, or Firm*—Ali Kamarei

[57] ABSTRACT

The system provides system and method for having a customer register with a computer system a PIN, one or more registration biometric samples, and one or more of the customer's financial accounts. During an initiation step, the customer initiates an account access at an ATM or a PC or any other financial access device, by entering the customer's personal authentication information comprising a PIN and at least one bid biometric sample. No portable man-made memory devices such as smartcards or swipe cards are used in this step. In a transmission step, an account access request message comprising the personal authentication information of the customer and other data are forwarded from the ATM to the computer system. After the computer system receives the personal authentication information in the account access request message, the personal authentication information is compared with the registration biometric samples to produce either a successful or failed identification of the customer in a customer identification step. Should such identification be successful, a financial account number of the customer is retrieved in a retrieval step. Finally, the customer is allowed to access the customer financial account after successful identification of the customer. As a result, a customer can access financial accounts without having to use any tokens such as portable man-made memory devices such as smartcards or swipe cards. This allows customers to quickly select one of a group of different financial accounts.

38 Claims, 15 Drawing Sheets

U.S. PATENT DOCUMENTS

| | | | |
|---|---|---|---|
| 5,229,764 | 7/1993 | Matchett et al. | 340/825.34 |
| 5,230,025 | 7/1993 | Fisfbine et al. | 382/4 |
| 5,239,583 | 8/1993 | Parrillo | 380/23 |
| 5,241,606 | 8/1993 | Horie | 382/4 |
| 5,251,259 | 10/1993 | Mosley | 380/23 |
| 5,265,162 | 11/1993 | Bush et al. | 380/24 |
| 5,276,314 | 1/1994 | Martino et al. | 235/380 |
| 5,280,527 | 1/1994 | Gullman et al. | 380/23 |
| 5,321,242 | 6/1994 | Heath, Jr. | 235/382 |
| 5,325,442 | 6/1994 | Knapp | 382/4 |
| 5,335,288 | 8/1994 | Faulkner | 381/2 |
| 5,343,529 | 8/1994 | Goldfine et al. | 380/23 |
| 5,351,303 | 9/1994 | Wilmore | 382/4 |

5,764,789

TOKENLESS BIOMETRIC ATM ACCESS SYSTEM

CROSS-REFERENCE

The present application is a continuation-in-part of U.S. patent application Ser. No. 08/442,895 filed May 17, 1995 now U.S. Pat. No. 5,613,012, which is a continuation-in-part of U.S. patent application Ser. No. 08/345,523, filed Nov. 28, 1994 now U.S. Pat. No. 5,615,277, which are incorporated herein by reference.

BACKGROUND OF THE INVENTION

The use of a token, an inanimate object which confers a capability to the customer presenting it, is pervasive in today's financial world. Whether a customer is buying groceries in a supermarket, or withdrawing money from an ATM, at the heart of the transaction is a money transfer enabled by a token, such as a plastic debit or credit swipe card, which acts to identify both the customer as well as the financial account being accessed.

From their inception in the late 1970s, token-based systems for accessing financial services have grown increasingly more prevalent in the banking industry. However, as token-based systems access have become more popular with customers, they have also become more popular with criminals intent on perpetrating fraud. Currently, fraud losses in the financial industry stem from many different areas, but they are mainly due to either stolen or counterfeit cards.

Generally, debit cards are used in conjunction with a personal identification number (PIN). The PIN helps to prevent lost or stolen cards from being used by criminals, but over time various strategies have been used to obtain PINs from unwary cardholders. Such strategies include Trojan horse automated teller machines (ATMs) in shopping malls that dispense cash but record the PIN, to fraudulent debit devices that also record the PIN, to criminals with binoculars that watch cardholders enter PINs at ATMs. The subsequently manufactured counterfeit debit cards are then used in various ATM machines to fraudulently withdraw funds until the account is emptied.

Customer-based fraud for debit cards is also on the rise. Customers intent on this sort of fraud will claim that they lost their card, say that their PIN was written on the card, and then withdraw money from their account using card, and then refuse to be responsible for the loss.

The financial industry is constantly taking steps to improve the security of tokens, such as debit cards and new smartcards. However, the linkage between the customer and his token remains tenuous, and that is the fundamental reason behind the increasing card fraud.

One solution that would reduce counterfeit-card fraud involves using a smartcard that includes a biometric. In this approach, authenticated biometrics are recorded from a customer of known identity and stored for future reference on a token. In every subsequent account access, the customer is required to physically enter the requested biometric, which is then compared to the authenticated biometric on the token to determine if the two match in order to verify customer identity.

Various biometrics have been suggested for use with smartcards, such as fingerprints, hand prints, voice prints, retinal images, handwriting samples and the like. However, the biometrics are generally stored on a token in electronic form, and thus the biometrics can be fraudulently copied and reproduced. Because the comparison and verification process is not isolated from the hardware and software directly used by the customer attempting access, a significant risk of fraud still exists. Examples of this approach to system security are described in U.S. Pat. Nos. 4,821,118 to Lafreniere; 4,993,068 to Piosenka et al.; 4,995,086 to Lilley et al.; 5,054,089 to Uchida et al.; 5,095,194 to Barbanell; 5,109,427 to Yang; 5,109,428 to Igaki et al.; 5,144,680 to Kobayashi et al.; 5,146,102 to Higuchi et al.; 5,180,901 to Hiramatsu; 5,210,588 to Lee; 5,210,797 to Usui et al.; 5,222,152 to Fishbine et al.; 5,230,025 to Fishbine et al.; 5,241,606 to Horie; 5,265,162 to Bush et al.; 5,321,242 to Heath, Jr.; 5,325,442 to Knapp; 5,351,303 to Willmore, all of which are incorporated herein by reference.

An example of another token-based biometric smartcard system can be found in U.S. Pat. No. 5,280,527 to Gullman et al. In Gullman's system, the user must carry and present a credit card sized token (referred to as a biometric security apparatus) containing a microchip in which is recorded characteristics of the authorized user's voice. In order to initiate the access procedure, the user must insert the token into a terminal such as an ATM, and then speak into the terminal to provide a biometric sample for comparison with an authenticated sample stored in the microchip of the presented token. If a match is found, the remote terminal signals the host computer that the account access should be permitted, or may prompt the user for an additional code, such as a PIN which is also stored on the token, before authorizing the account access.

Although Gullman's reliance on comparing biometrics reduces the risk of unauthorized access as compared to PIN codes, Gullman's use of the token as the repository for the authenticating data combined with Gullman's failure to isolate the identity verification process from the possibility of tampering greatly diminishes any improvement to fraud resistance resulting from the replacement of a PIN with a biometric. Further, the system remains inconvenient to the customer because it requires the presentation of a token in order to authorize an account access.

Uniformly, the above patents that disclose financial authorization systems teach away from biometric recognition without the use of tokens. Reasons cited for such teachings range from storage requirements for biometric recognition systems to significant time lapses in identification of a large number of individuals, even for the most powerful computers.

Furthermore, any smartcard-based system will cost significantly more than the current magnetic stripe card systems currently in place. A PIN smartcard costs perhaps $3, and a biometric smartcard will cost $5. In addition, each station that currently accepts existing debit cards would need a smartcard reader, and if biometrics are required, a biometric scanner will also have to be attached to the reader as well.

This costly price tag has forced the industry to look for additional applications of the smartcard beyond simple banking and debit needs. It is envisioned that in addition to storing credit and debit account numbers and biometric or PIN authentication information, smartcards may also store phone numbers, frequent flyer miles, coupons obtained from stores, a transaction history, electronic cash usable at tollbooths and on public transit systems, as well as the customer's name, vital statistics, and perhaps even medical records.

The net result of this "smartening" of the token is increasing centralization of functions and increasing dependence on the token itself, resulting in increased vulnerability for the customer. Given the number of functions that the smartcard will be performing, the loss or damage of this all-important card will be excruciatingly inconvenient for the cardholder. Being without such a card will financially incapacitate the cardholder until it is replaced. Additionally, losing a card full of electronic cash may also result in a real financial loss as well.

Thus, after spending vast sums of money, the resulting system will be somewhat more secure, but will levy heavier penalties on the customer for destruction or loss of the card.

To date, the banking industry has had a simple equation to balance: in order to reduce fraud, the cost of the card must increase. This cost is passed along to customers.

As a result, there has long been a need for an ATM access system that is highly fraud-resistant, practical, convenient for the customer, and yet cost-effective to deploy.

There is also a need for an ATM access system that identifies the customer, as opposed to merely verifying a customer's possession of any physical objects that can be freely transferred. This will result in a dramatic decrease in fraud, as only the authentic customer can access his or her account.

A further need in an account access system is ensuring customer convenience by providing access without forcing the customer to possess, carry, and present one or more proprietary objects in order to authorize an account access. All parties intent on fighting fraud recognize that any system that solves the fraud problem must take the issue of convenience into account, however the fundamental yet unrecognized truth of the situation is, the card itself is extremely inconvenient for the customer. This may not be initially obvious, but anyone who has lost a card, left a card at home, or had a card stolen knows well the keenly and immediately-felt inconvenience during the card's absence.

Yet another need in the industry is for a system that greatly reduces or eliminates the need to memorize cumbersome codes in order to access all of his accounts.

There is further a need for a system that affords a customer the ability to alert authorities that a third party is coercing the account access without the third party being aware that an alert has been generated. There is also a need for a system that is able to effect, unknown to the coercing third party, temporary restrictions on the types and amounts of account accesses that can be undertaken.

Lastly, such a system must be affordable and flexible enough to be operatively compatible with existing networks having a variety of electronic access devices and system configurations.

SUMMARY OF THE INVENTION

The present invention satisfies these needs by providing a method and system for tokenless access to financial accounts provided by various institutions. Customers can access their financial accounts using automated terminals without having to use any portable man-made memory devices, such as smartcards, or swipe cards.

The system provides means and method for having a customer register with a computer system a PIN, one or more registration biometric samples, and one or more of the customer's financial accounts. During an initiation step, the customer initiates an account access at an ATM or a PC or any other financial access device, by entering the customer's personal authentication information comprising a PIN and at least one bid biometric sample. No portable man-made memory devices such as smartcards or swipe cards are used in this step. In a transmission step, an account access request message comprising the personal authentication information of the customer and other data are forwarded from the ATM to the computer system. After the computer system receives the personal authentication information in the account access request message, the personal authentication information is compared with the registration biometric samples to produce either a successful or failed identification of the customer in a customer identification step. Should such identification be successful, a financial account number of the customer is retrieved in a retrieval step. Finally, the customer is allowed to access the customer financial account after successful identification of the customer.

It is preferred that the customer identification step is accomplished preferably in less than about 2 seconds, whereby the entire authorization of access is completed within a commercially acceptable timeframe. Once the customer is allowed access to the customer financial account number, any number of financial operations can be performed including obtaining cash, depositing funds, transferring funds between accounts, obtaining account balances, paying bills, and obtaining electronic cash.

In another embodiment the system further comprises an authentication step wherein a private code, distinct from the PIN and not used to gain access to the computer system, is gathered from the customer during the customer registration step and is presented to only the customer during a presentation step, whereby the customer is assured that the authentic computer system was used to process the account access because a false computer system would not be able to present the customer's private code.

In a preferred embodiment, the customer registration step further comprises assigning an account index code to each customer financial account. The account index code further comprises one or more alphanumeric characters. Additionally there is an account specification step, where the customer enters an account index code, the account index code is included in the account access request message, and the computer system retrieves the customer financial account number using the account index code from the account access request message. In a different embodiment, the registration step further comprises assigning an account index name to an account index code. In this embodiment, it is preferred that an account name display step be included, wherein a list of accounts with their account index names is retrieved and displayed to the customer after a successful identification.

In another embodiment, during the customer registration step, the customer registers an emergency account index code, which if entered by the customer in place of the account index code, triggers a silent alarm, whereby authorities are notified of a coerced account access. In this embodiment, during the registration step, the customer specifies any combination of actions taken upon the triggering of the silent alarm, comprising artificial financial resource limits, presentation of a false private code, rejection of the account access, dispensing marked bills, notifying the authorities, or sending the silent alarm to the institution.

In yet another embodiment, the customer registers an emergency PIN during the registration step which, if entered by the customer during an initiation step in place of his PIN, triggers a silent alarm. In this embodiment, the customer specifies any combination of actions taken upon the triggering of the silent alarm, comprising artificial financial resource limits, presentation of a false private code, rejection of the account access, dispensing marked bills, notifying the authorities, or the sending of the silent alarm to the institution.

It is understood that the ATM is remote from the institution and communicates with the institution using a computer network. The computer network is one or more of the group comprising an ATM network, the Internet, a private intranet, a telephone network, or a cable TV network. In order to increase security of the system and the communication between its components, it is preferable that the communications with the computer system be encrypted.

In order to further increase the security of the system, an embodiment of the invention comprises a customer registration step wherein the customer's registration biometric samples are compared to previously designated biometric samples of certain customers wherein if a match occurs, the customer is determined to have re-registered, whereby customers who have perpetrated fraud on the system can be automatically identified from their biometrics alone when they re-register. In this embodiment it is preferred that the registration step further comprise collecting the biometric samples from a specific finger, such as the index finger, whereby the system can detect re-registrations of previously designated biometric samples of certain customers.

Although the detailed description of the invention may speak about biometrics from fingerprint scanning, it is understood that the biometrics sample is selected from the set of fingerprint biometrics, retinal image biometrics, or voice print biometrics.

In yet another embodiment of the invention a biometric theft resolution step is included, where the PIN of the customer is changed to prevent unauthorized access by individuals who have obtained the customer's personal authentication information.

The present invention is clearly advantageous over the prior art in a number of ways.

First, it is extremely easy and efficient for the customer to use because it eliminates the need to carry and present any tokens in order to access one's accounts. The present invention eliminates all the inconveniences associated with carrying, safeguarding, and locating tokens. Further, because tokens are often specific to a particular computer system that further requires remembering a secret PIN code assigned to the particular token, this invention eliminates all such tokens and thereby significantly reduces the amount of memorization and diligence increasingly required of customers by providing protection and access to all financial accounts using only one PIN. The customer is now uniquely empowered, by means of this invention, to conveniently access his financial accounts at any time without dependence upon tokens which may be stolen, lost or damaged.

Further, the substantial manufacturing and distributing costs of issuing and reissuing all debit card tokens will be eliminated, thereby providing further economic savings to issuing banks, and ultimately to customers.

Moreover, the invention is markedly advantageous and superior to existing systems in being highly fraud resistant. As discussed above, present authorization systems are inherently unreliable because they base determination of a user's identity on the physical presentation of a manufactured object along with information that the user knows. Unfortunately, both the token and information can be transferred to another person, through theft or by voluntary action of the authorized customer. Thus, unless the loss or unintended transfer of these items is realized and reported by the customer, anyone possessing such items will be mistakenly recognized by existing account access systems as the authorized customer to whom that token and its corresponding financial accounts are assigned.

By contrast, the present invention virtually eliminates the risk of granting access to unauthorized people by determining a customer's identity from an analysis of unique biometric characteristics. Even in the rare circumstance of coercion, where an authorized customer is forced by a coercing party to access his accounts, the system provides an emergency account index code, whereby the authorized customer can alert authorities of the transgression without the knowledge of the coercing party.

The invention further prevents fraud by storing authentication information and carrying out identity verification operations at a location that is operationally isolated from the customer requesting access, thereby preventing a criminal from acquiring copies of the authentication information or from tampering with the verification process. Such a system is clearly superior to existing token-based systems wherein the biometric authentication information are stored on and can be recovered from the token, and wherein the actual identity determination is performed at the same location as the customer during the authorization process.

It is an object of the invention therefore to provide a financial authorization system that eliminates the need for a customer to possess and present a physical object, such as a token, in order to authorize an account access.

It is another object of the invention to provide a financial authorization system that is capable of verifying a customer's identity based on one or more unique characteristics physically personal to the customer, as opposed to verifying mere possession of proprietary objects and information.

Yet another object of the invention is to provide a financial authorization system that is practical, convenient, and easy to use, where customers no longer need to remember multiple PINs to protect multiple accounts.

Another object of the invention is to provide increased security in a very cost-effective manner, by completely eliminating the need for ever more complicated and expensive tokens.

Still another object of the invention is to provide a financial services access system that is highly resistant to fraudulent account accesses by unauthorized people.

Yet another object of the invention is to provide a financial services access system that enables a customer to notify authorities that a particular account access is being coerced by a third party without giving notice to said third party of the notification.

Another object of the invention is to provide a financial services access system that automatically restricts a customer's access according to a desired configuration provided by the customer when an account access is being coerced.

Still another object of the invention is to authenticate the system to the customer once the access is complete, to alert the customer to any attempt by criminals to steal a customer's authentication information.

These and other advantages of the invention will become more fully apparent when the following detailed description of the invention is read in conjunction with the accompanying drawings.

DETAILED DESCRIPTION OF THE INVENTION

The objective of this invention is to provide a tokenless, secure, reliable, safe, and consistent, method for identifying customers for the purpose of authorizing access to accounts for large numbers of customers. It is the essence of this invention that customers have the ability to access their accounts without the use of any tokens whatsoever. In order to be functional it is important that the system operate at speeds similar to those currently in operation. The system must be secure, such that customers' records and their biometric information remain confidential and safe, both within the computer system that identifies the customer and authorizes access, as well as during collection and transfer of authentication information between the computer system and the remote sites with which the computer system communicates.

Furthermore, the system must be reliable in that errors in identification and authorization must be infrequent and not hamper or make use of the system cumbersome. Since only the use of biometrics are contemplated for identification of customers, the system must also have security measures during emergency cases to either reduce access, even to the authorized customer, as well as notify authorities. It is appreciated that the system must be able to handle a large number of customers, and accommodate storage and transfer of large amounts of data, such as biometric information, commensurate with speeds at which financial services are accessed today.

Figure 1:
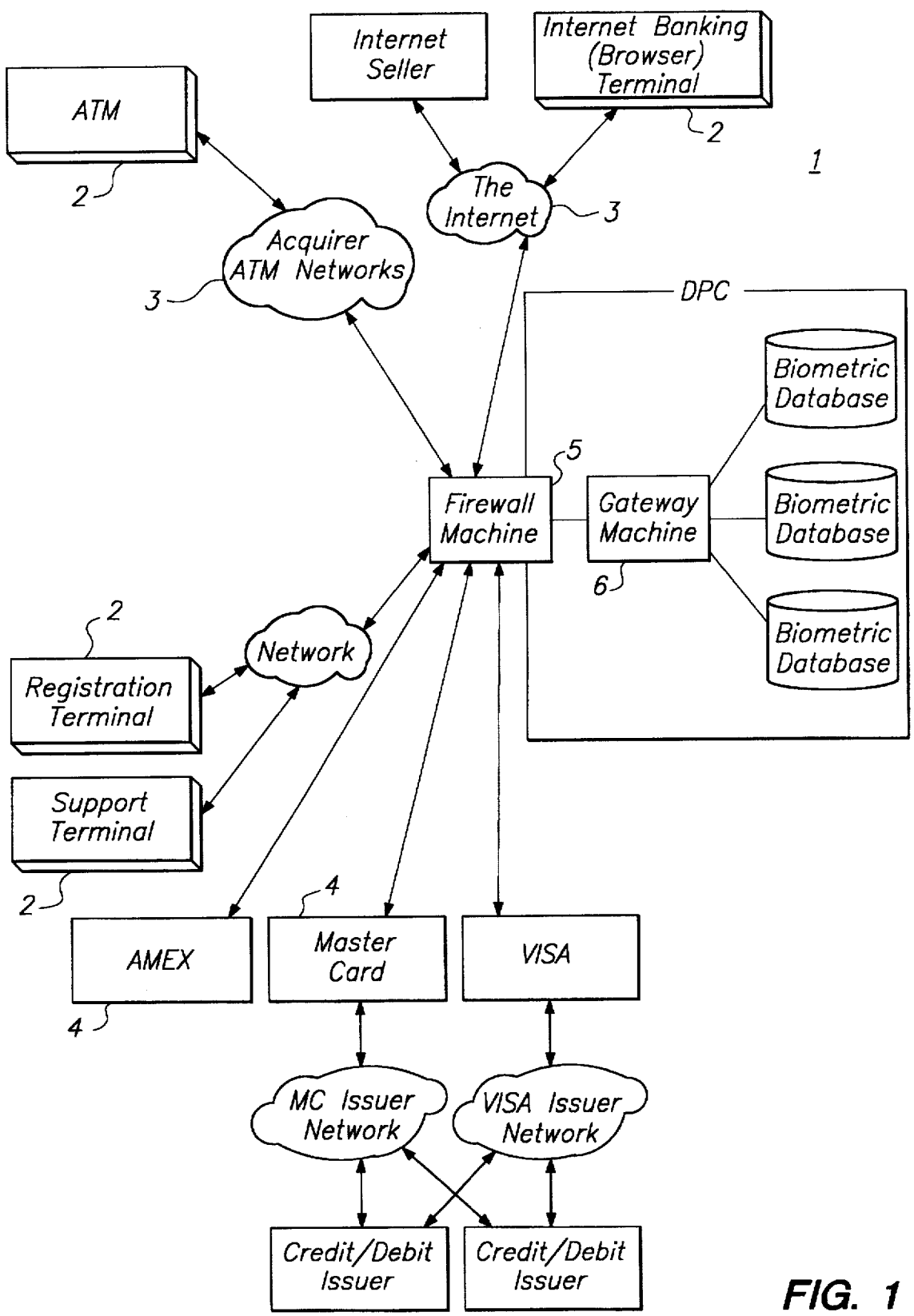
FIG. 1 is an overview diagram of the preferred embodiment of the system of the present invention.
Figure 2:
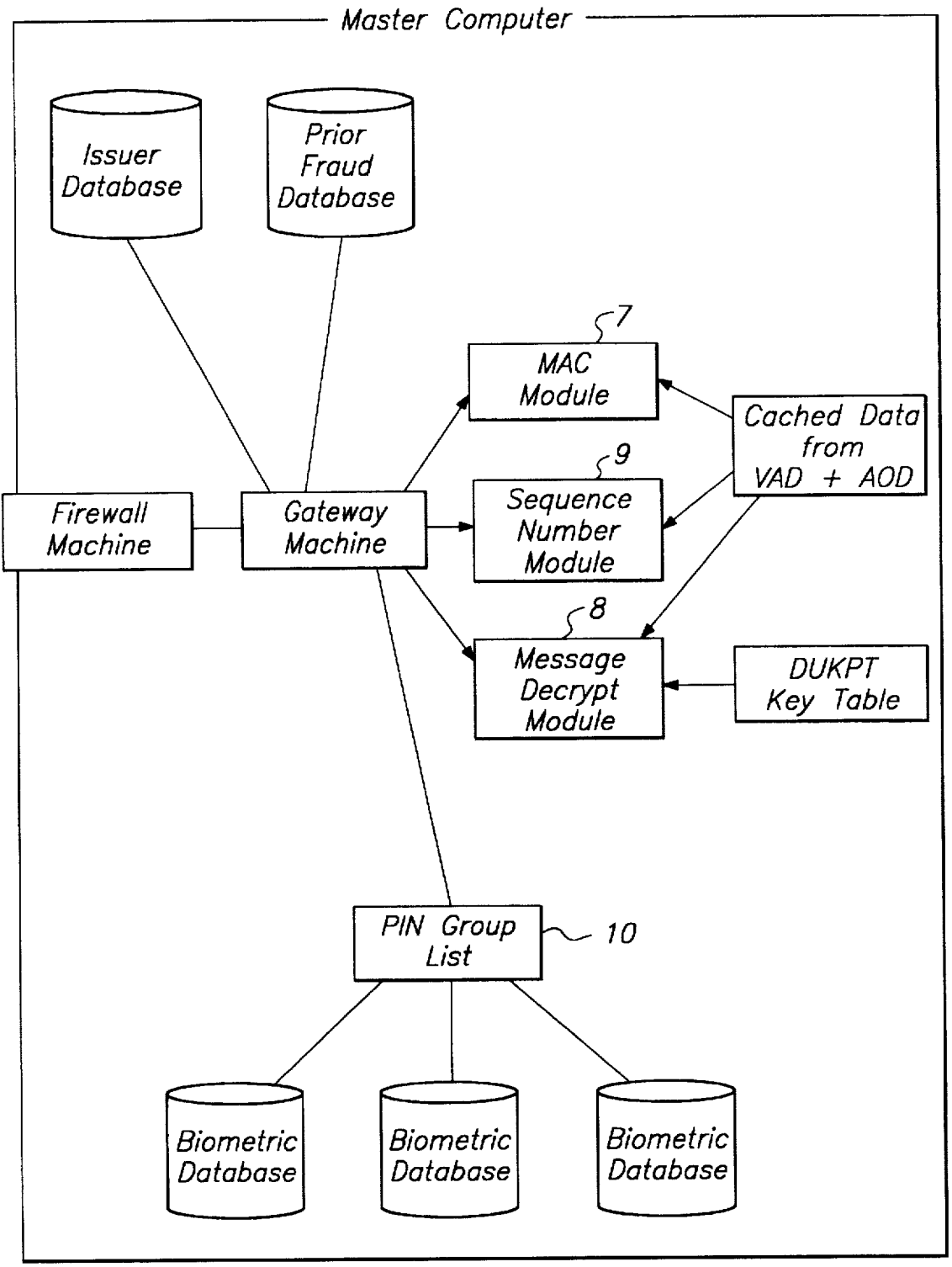
FIG. 2 is a diagram of the preferred embodiment of the computer system, called the Data Processing Center (DPC) and its internal databases and execution modules.

Turning now to the figures, the overall configuration of the invention and its components are shown in FIG. 1. Essentially a Data Processing Center (DPC) 1 is connected to various terminals 2 through various types of communication means 3. The DPC is also connected and communicates with independent computer networks 4. The DPC contains several databases and software execution modules as shown in FIG. 2. In a preferred embodiment of the invention, the databases are backed up or "mirrored" in distinct physical locations for safety reasons. The Firewall Machine 5 is responsible for prevention of electronic intrusion of the system while the Gateway Machine 6 is responsible for routing all requests from the customer, including adding, deleting and otherwise modifying all databases.

Figure 3:
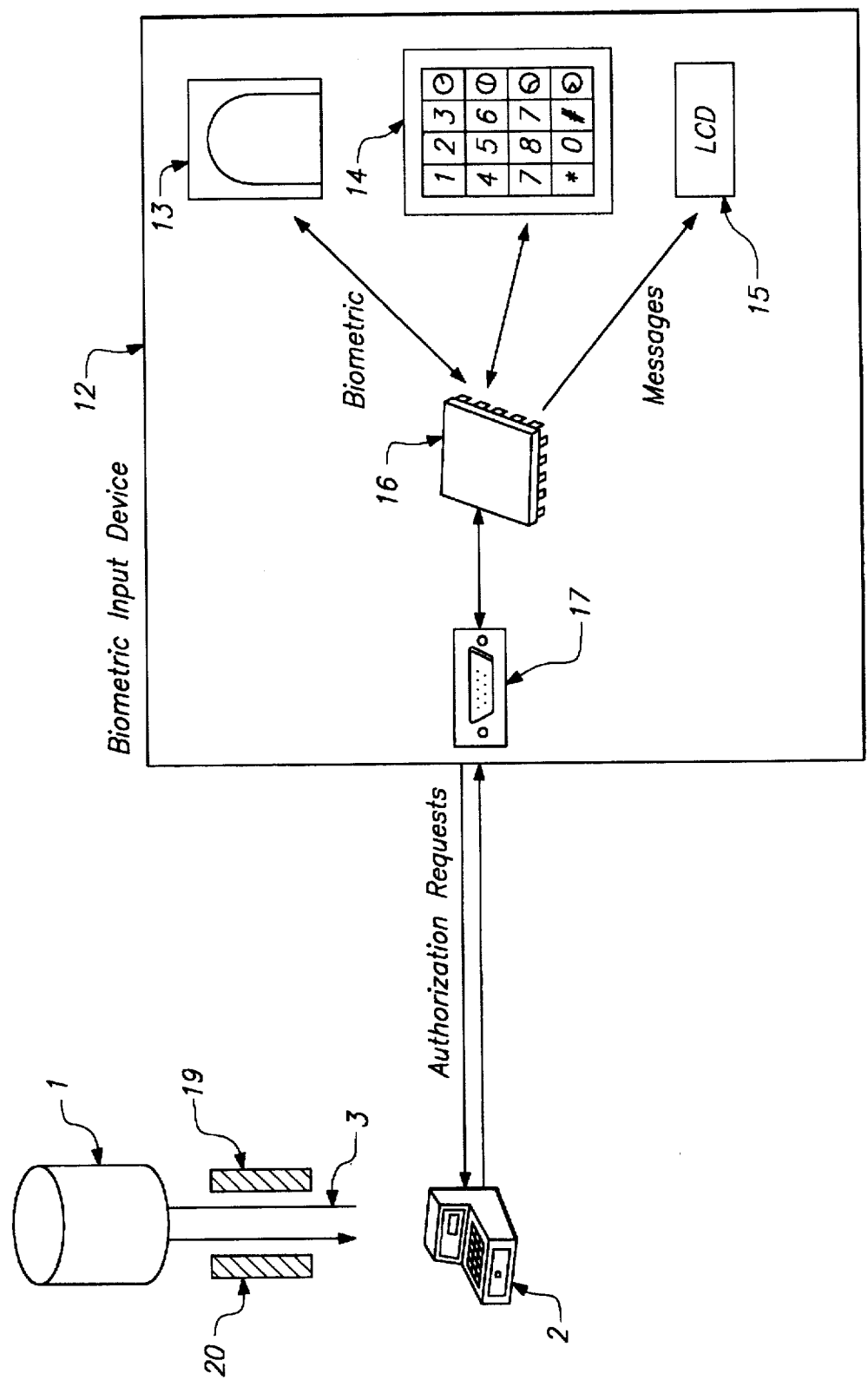
FIG. 3 is a diagram of the ATM terminal, the biometric input apparatus (BIA) and its components, and the interconnections between them.

In a preferred embodiment, some of the communications between the terminal and the DPC are encrypted for enhanced security. The Gateway Machine is also responsible for decryption and de-packaging of encrypted data that has arrived from the terminals using the MACM module 7, MDM module 8, and the SNM module 9. The PGL module 10 is used to locate the proper PIN code and biometric basket. FIG. 3 depicts an example of a terminal 2 and the biometric input device 12, which has a biometric scanner 13, data entry means such as a key pad or PIN pad 14, and a display panel 15. The biometric scanner can be any one of fingerprint scanner, voice input device (microphone), palm print scanner, retinal scanner or the like, although the fingerprint scanner will be used as an example. The biometric input device is further equipped with computing modules 16, device drivers, and erasable and non-erasable memory modules. The biometric input device communicates with the terminal through preferably a serial port 17. The terminal 2 communicates through a modem 18 with the DPC 1 through messages 19 and responses 20 using one of the interconnecting means in FIG. 1 such as a cable TV network, cellular telephone network, telephone network, the Internet, or an X.25 network.

Figure 4:
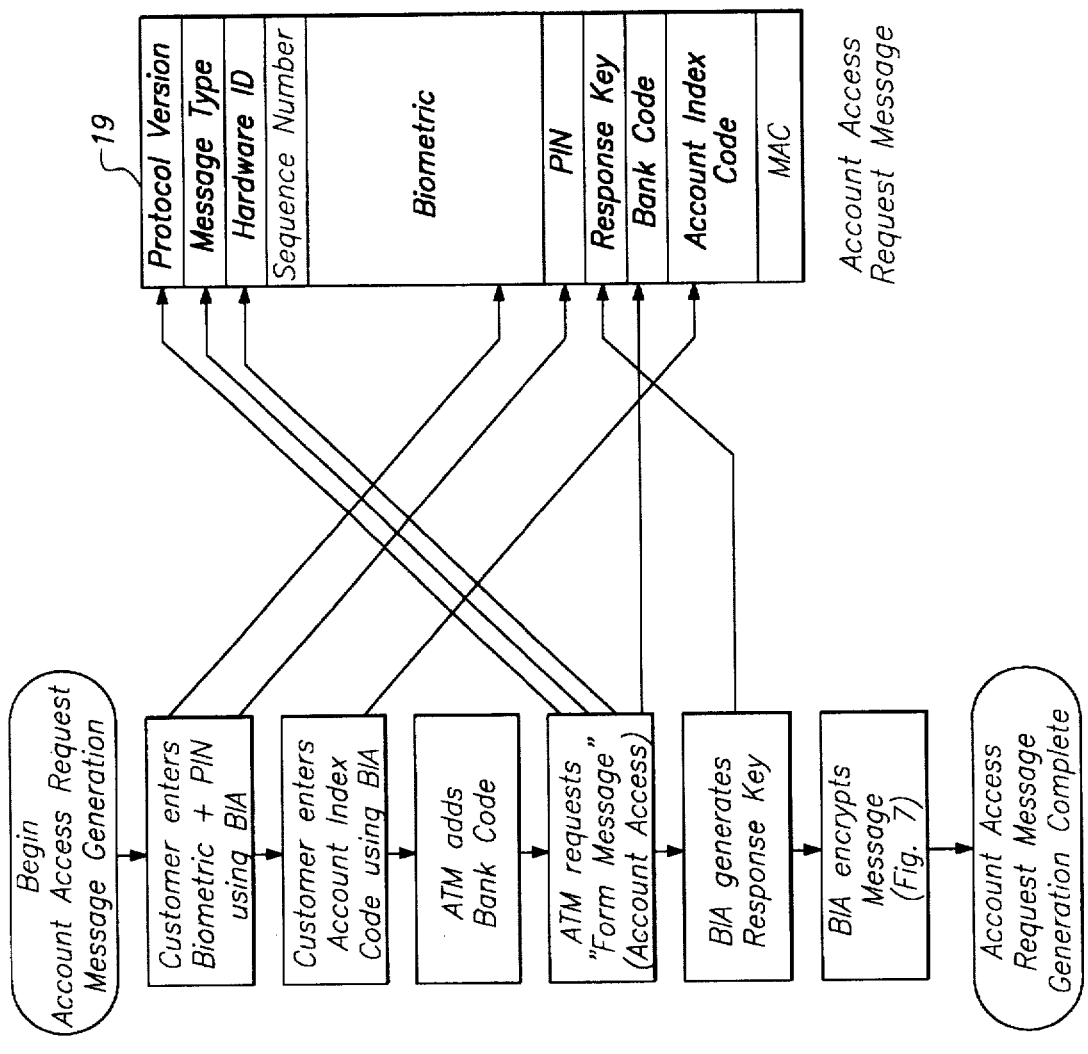
FIG. 4 is a flowchart depicting the generation of an account access request message.
Figure 6:
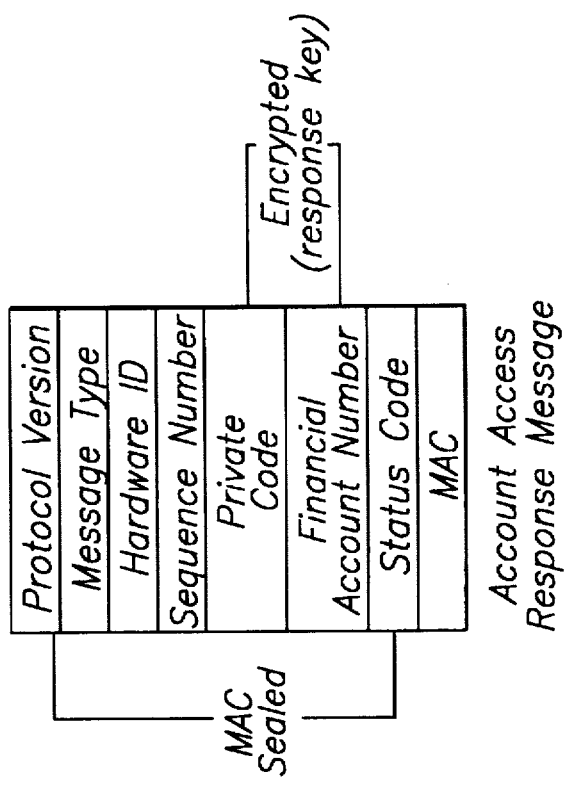
FIG. 6 is a visual representation of the account access response message.
Figure 5:
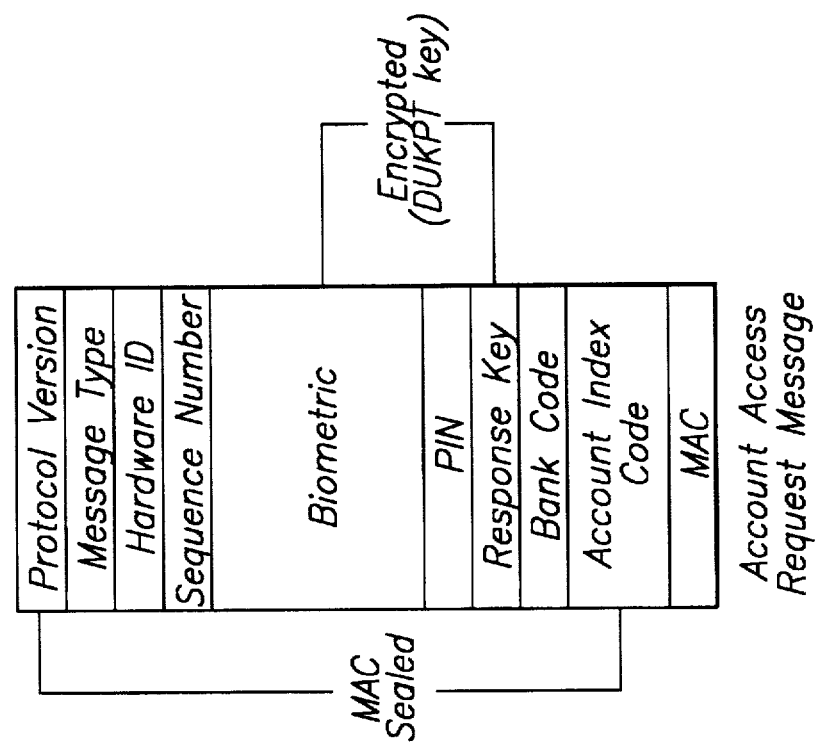
FIG. 5 is a visual representation of the account access request message.
Figure 7:
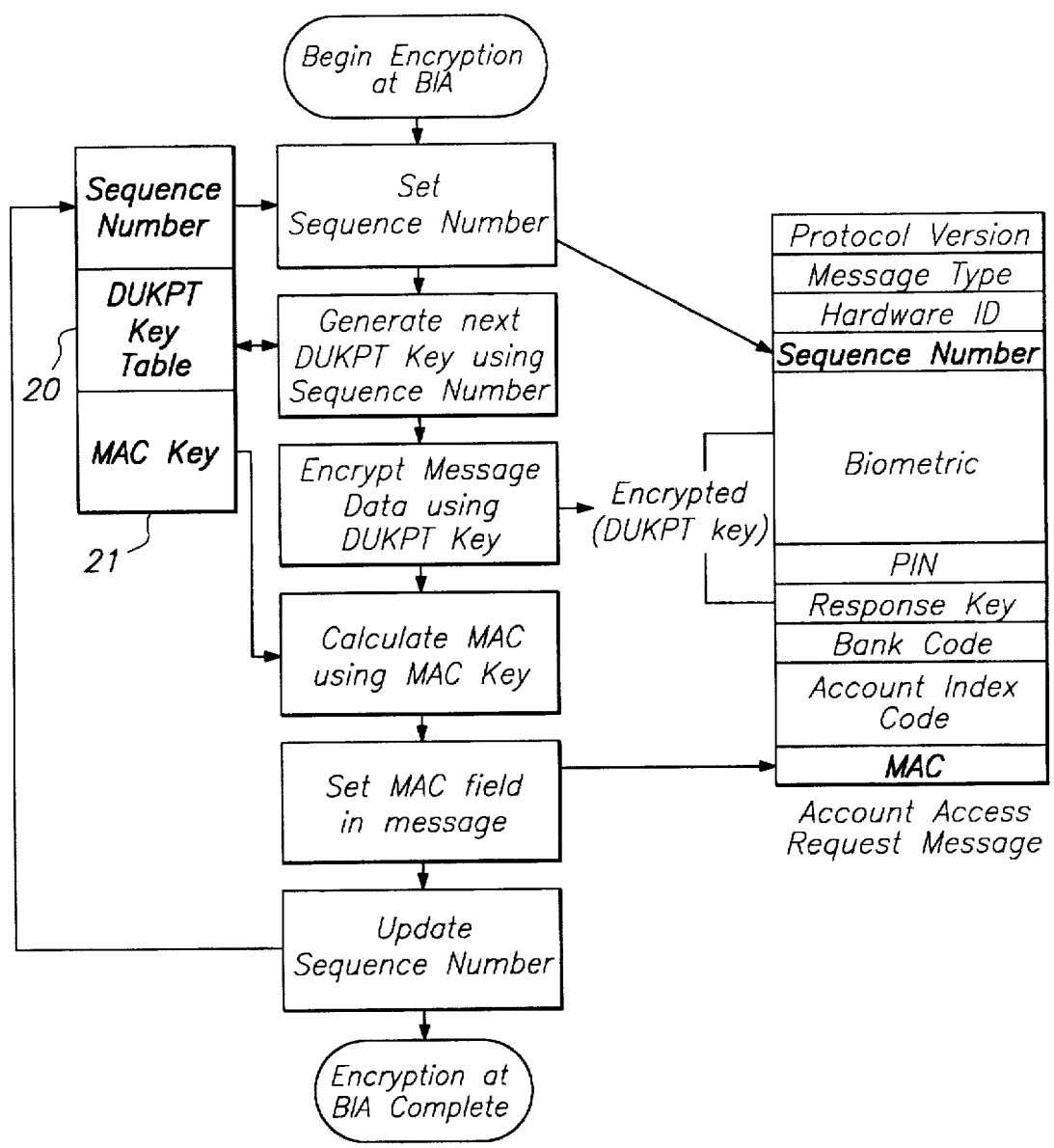
FIG. 7 is a flowchart depicting the data encryption and sealing process at the BIA.
Figure 8:
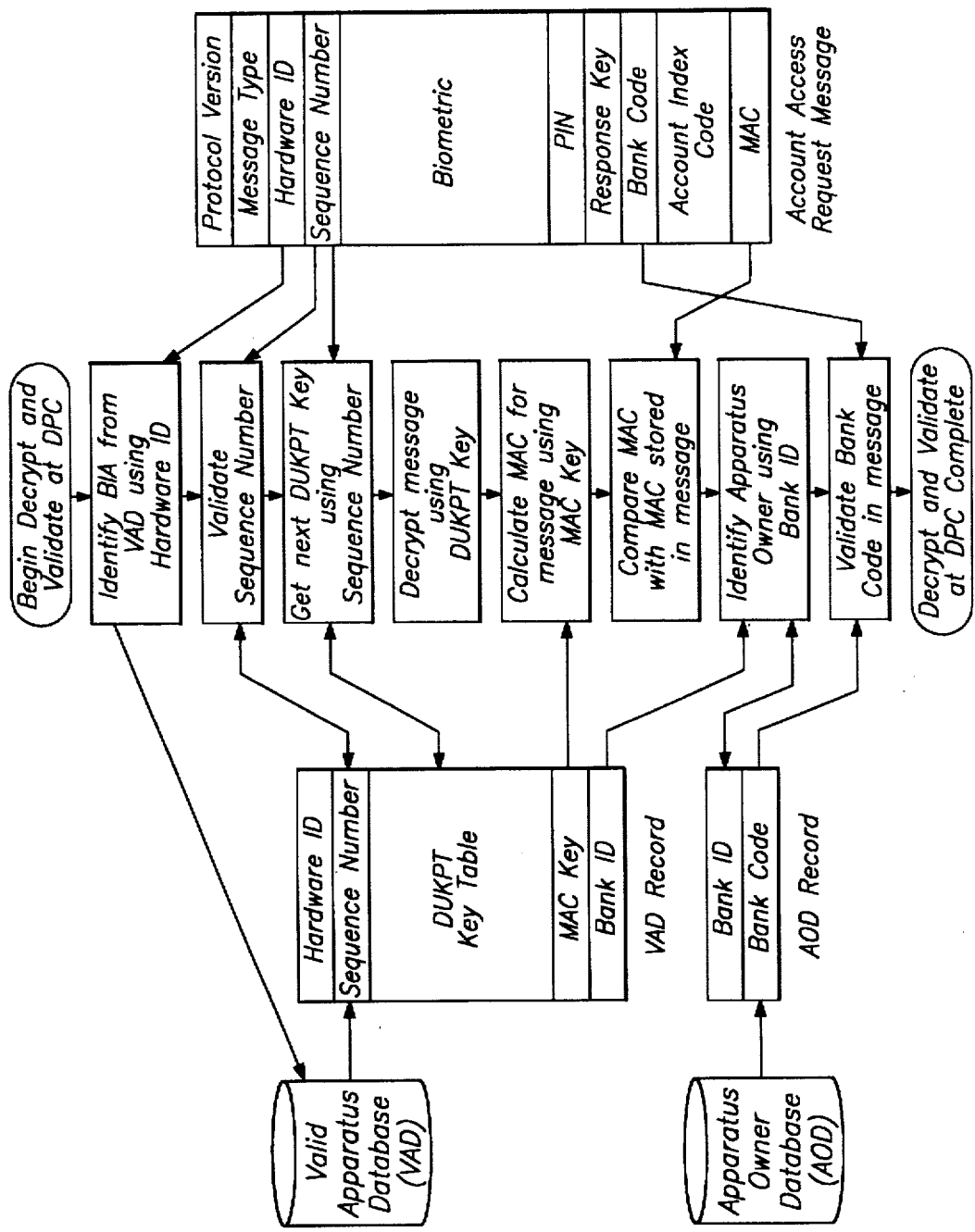
FIG. 8 is a flowchart depicting the message decryption and validation process at the DPC.
Figure 9:
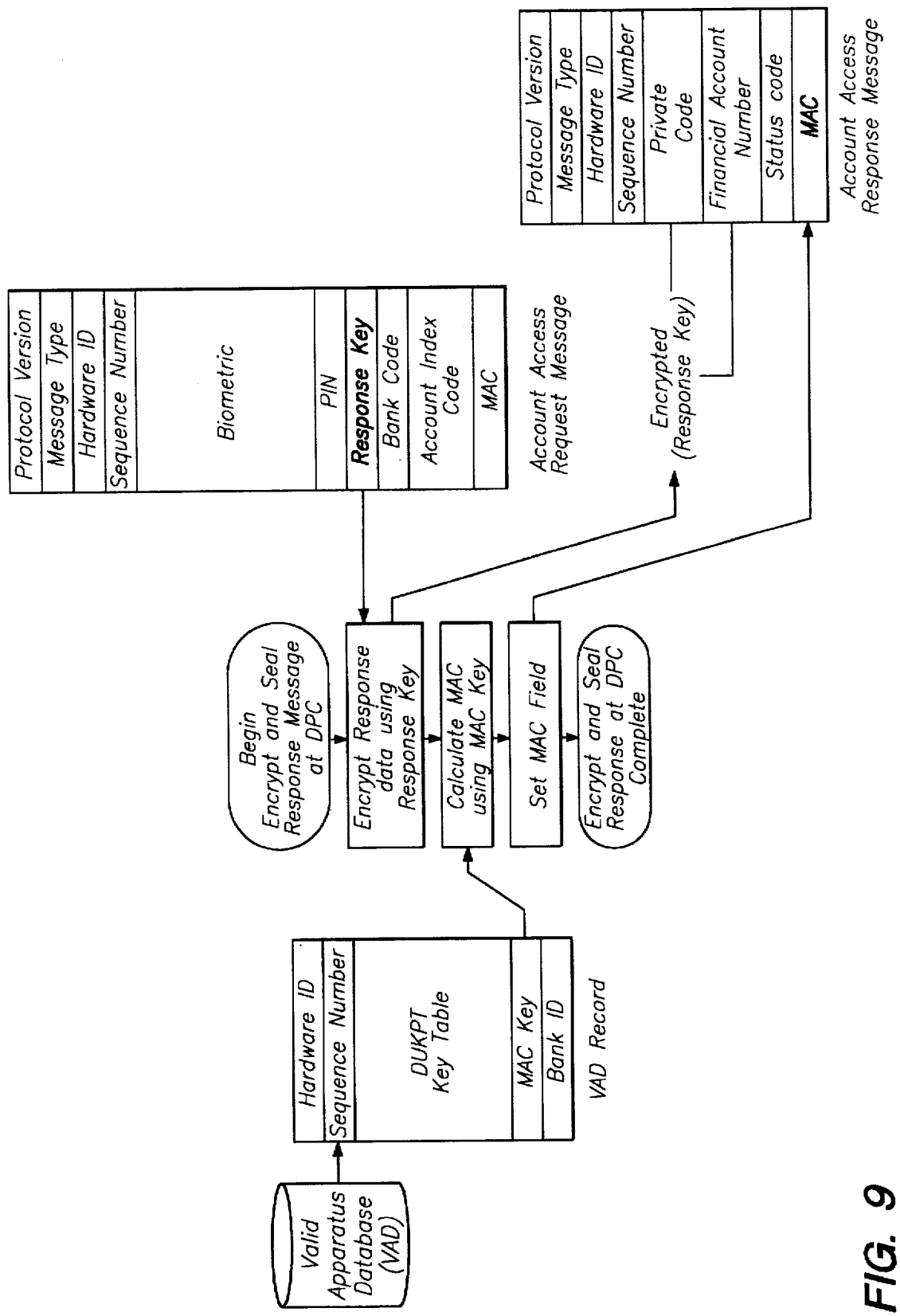
FIG. 9 is a flowchart depicting the data encryption and sealing of an account access response message at the DPC.
Figure 10:
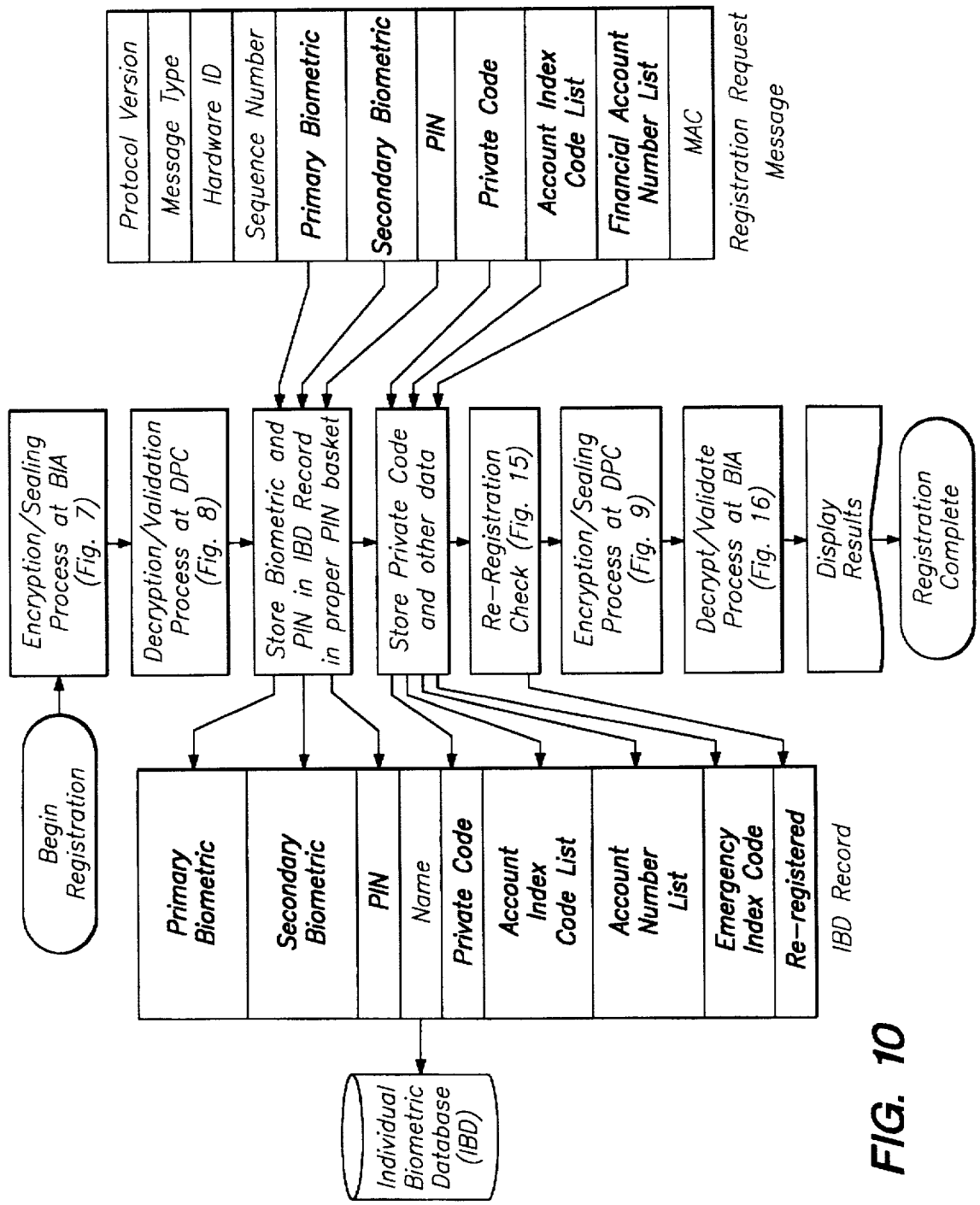
FIG. 10 is an overview flowchart of the customer registration process.
Figure 11:
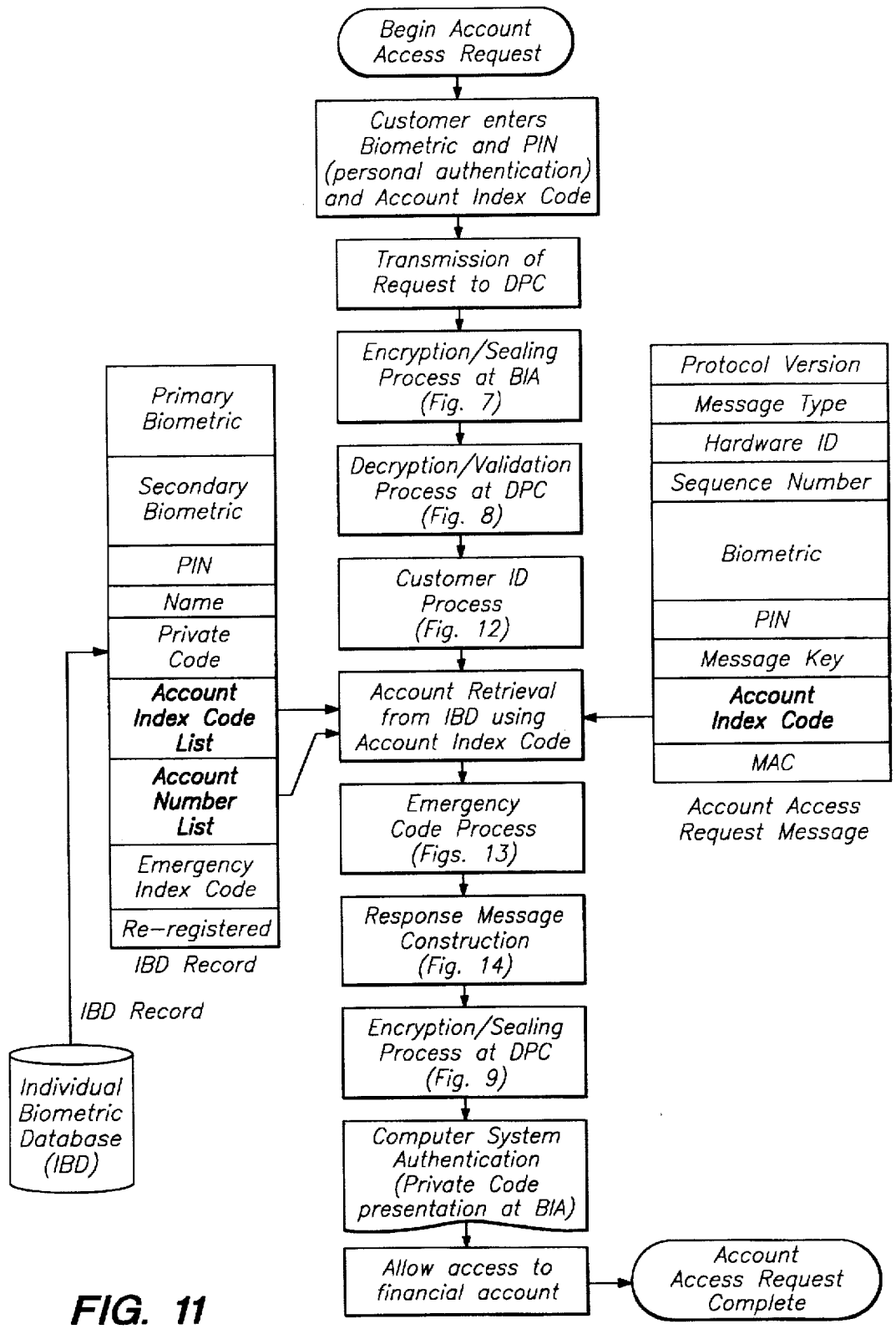
FIG. 11 is an overview flowchart of the customer account access process.
Figure 12:
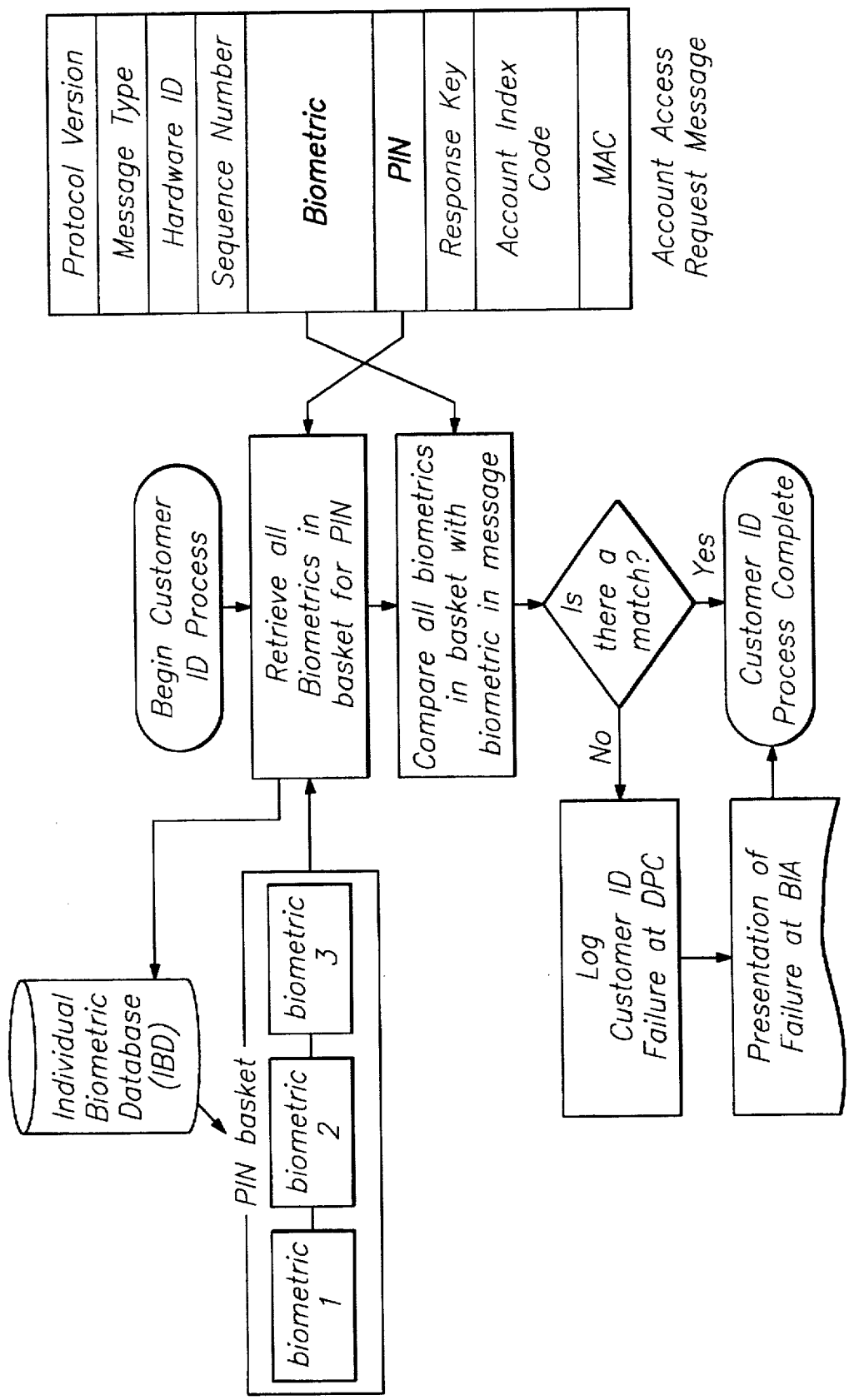
FIG. 12 is a flowchart depicting a customer identification step using the biometric and PIN from the account access request message at the DPC.
Figure 13:
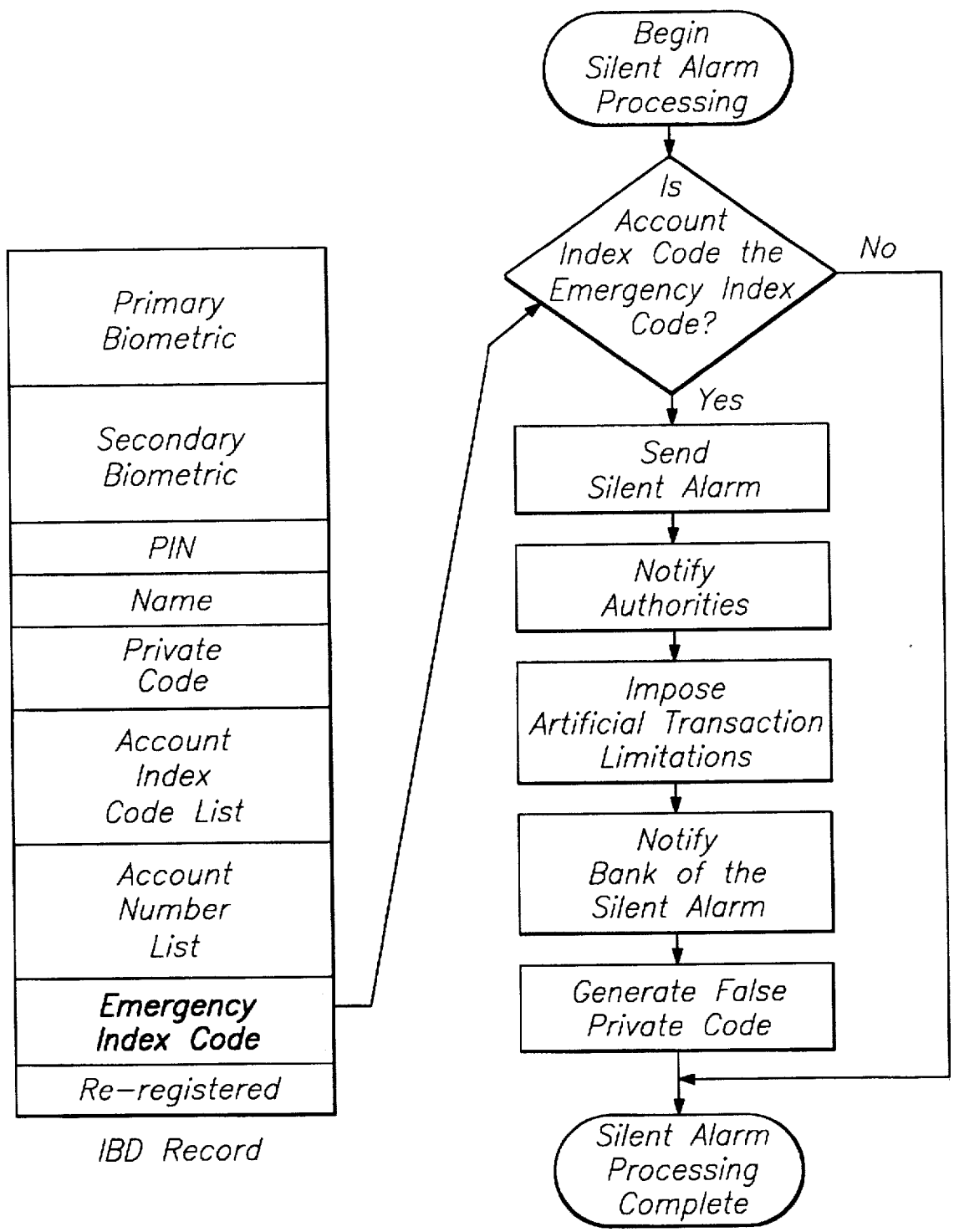
FIG. 13 is a flowchart depicting the silent alarm process using the emergency index code at the DPC.
Figure 14:
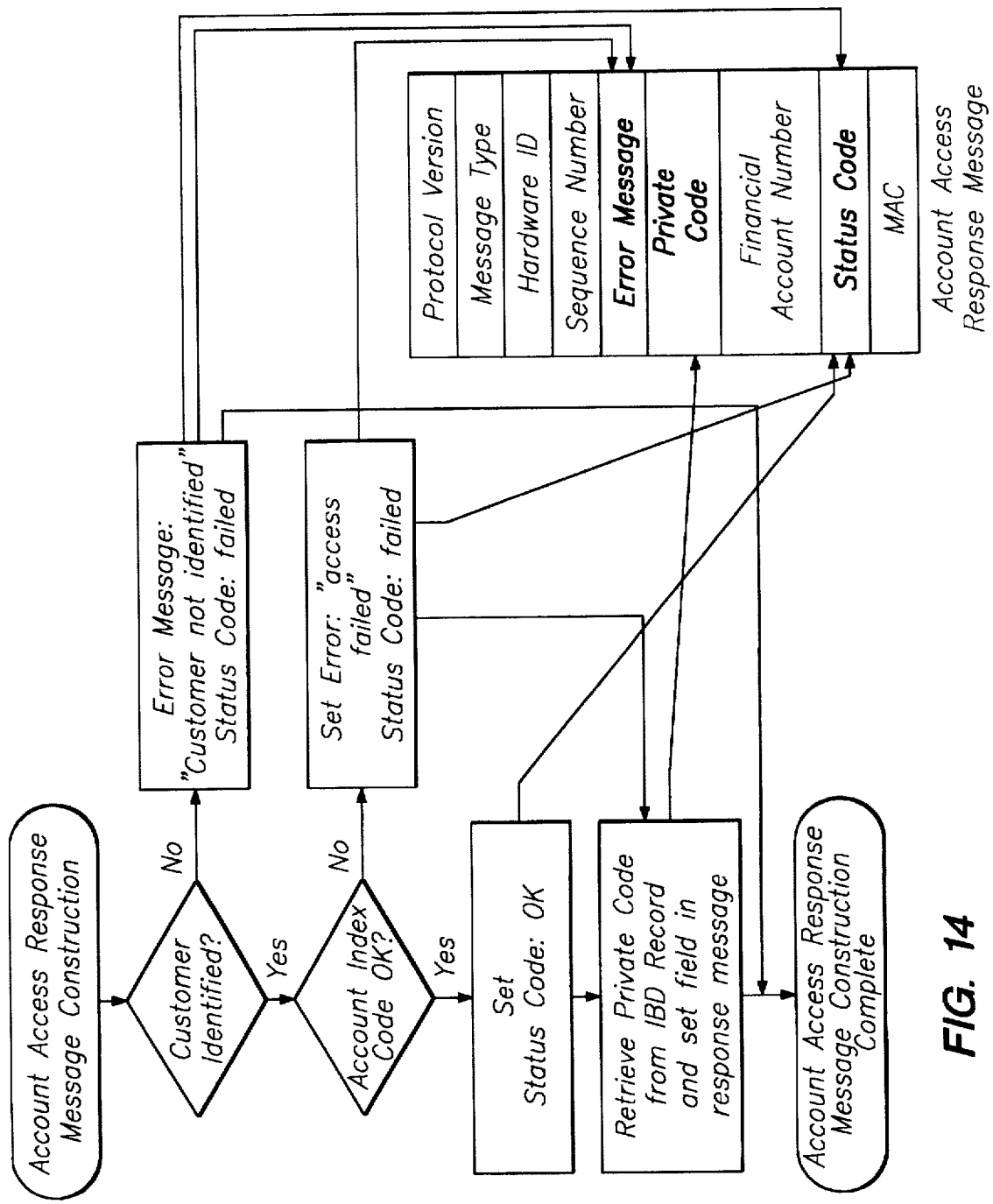
FIG. 14 is a flowchart depicting the generation of an account access response message at the DPC.
Figure 15:
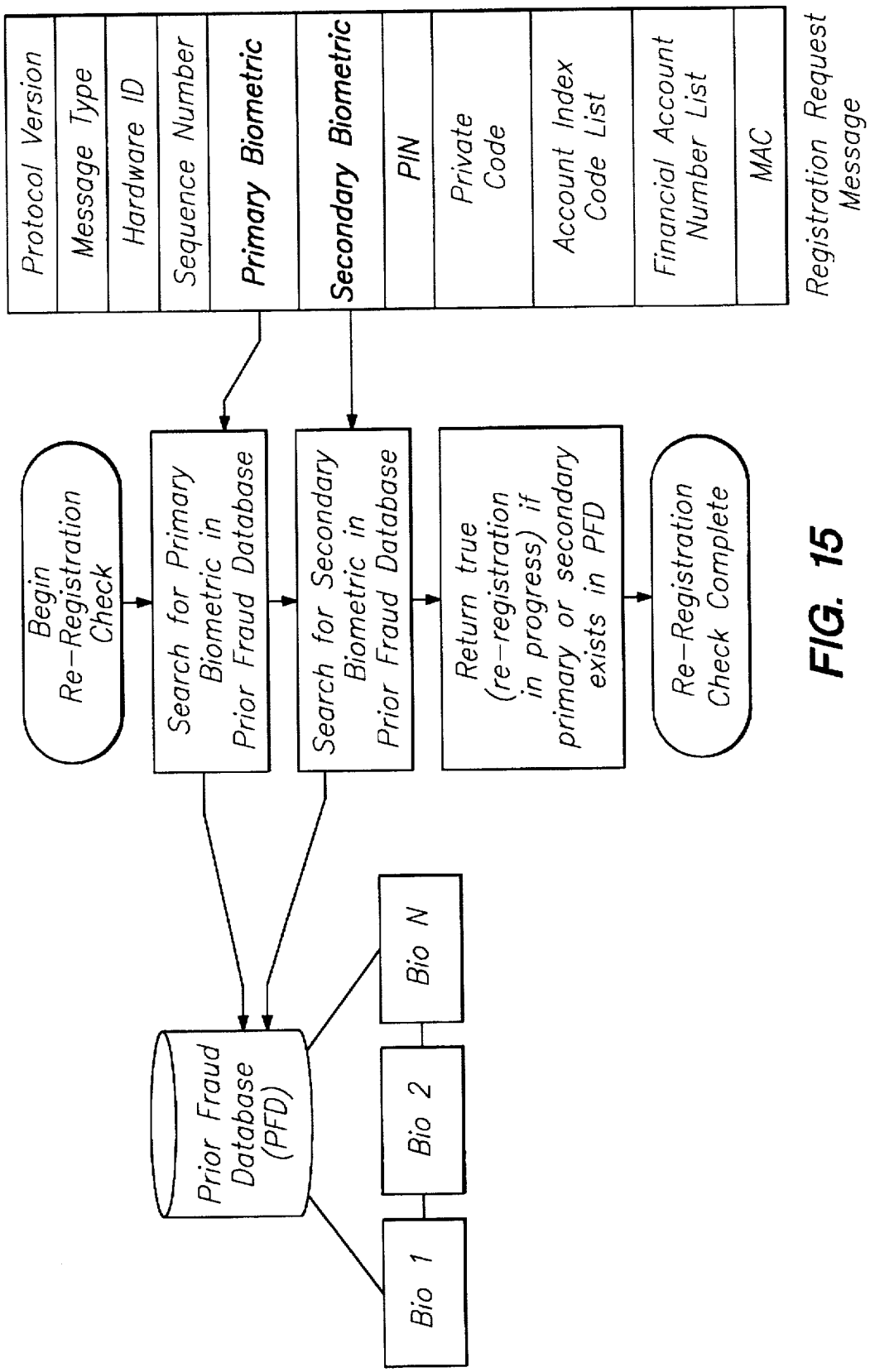
FIG. 15 is a flowchart depicting the re-registration check step at the DPC.
Figure 16:
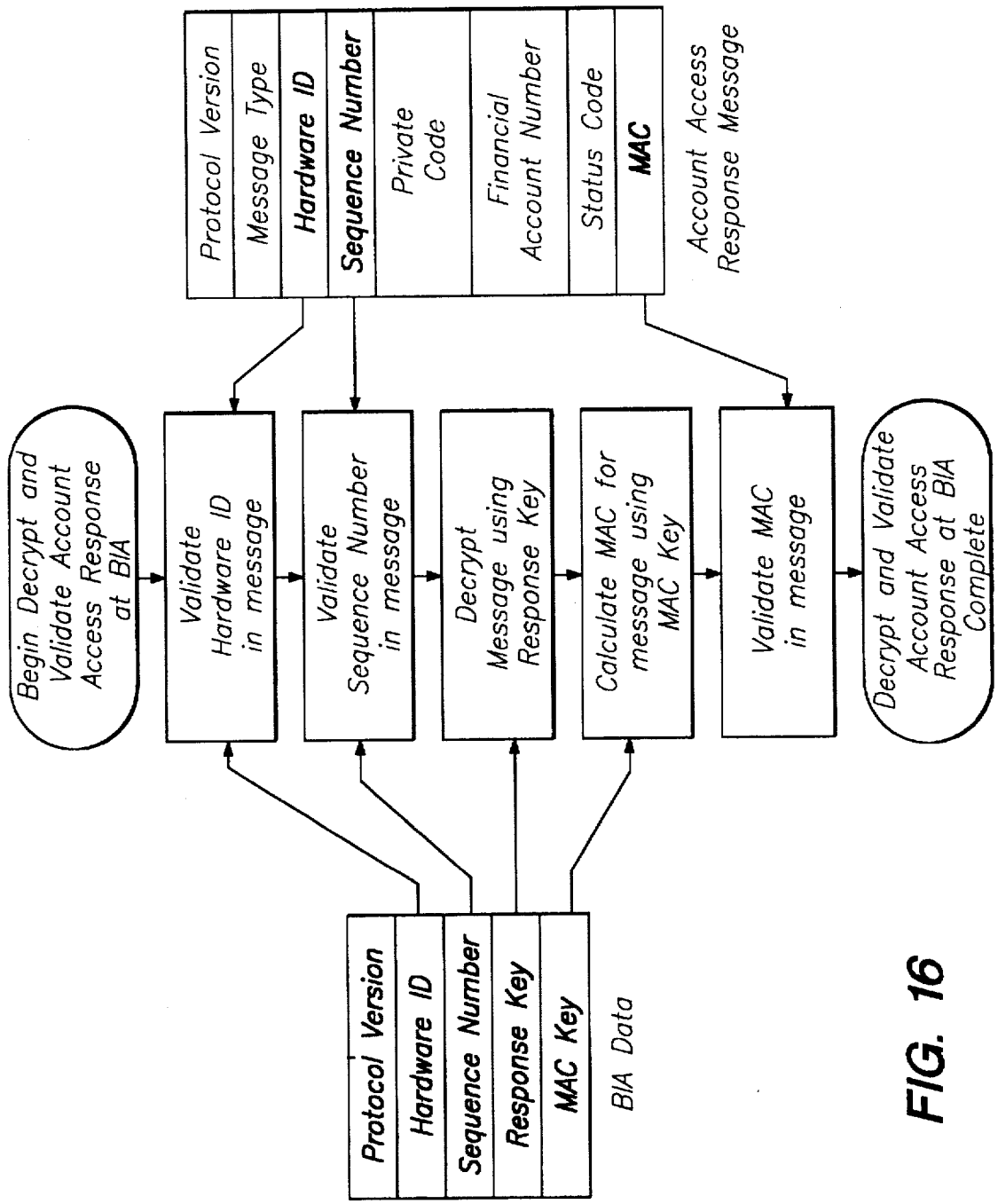
FIG. 16 is a flowchart depicting the decryption and validation of an account access response message at the BIA.

FIG. 4 shows the process of the formation and construction of an account access request message 19 at the BIA. FIG. 5 and FIG. 6 show a representational diagram of the account access request and response messages. Furthermore, it is shown which parts of the messages are encrypted and which ones are sealed. FIG. 7 is a block diagram of the overall process for data encryption and sealing showing the use of DUKPT key data 20 for encryption of data before appending additional data before sealing the message with a Message Authentication Code (MAC) 21. FIG. 8 and FIG. 9 show the decryption and encryption processes at the DPC. FIG. 10 shows the steps taken during the registration of a new customer. FIG. 11 describes the steps involved in processing an account access request from a customer, starting from entry of biometric-PIN personal authentication information at the BIA, all processing by the DPC, and then finally the presentation of results by the BIA. FIG. 12 describes the customer ID process at the DPC. FIG. 13 describes the processing of silent alarms at the DPC. FIG. 14 shows the process for the account access response message construction. FIG. 15 shows the prior fraud re-registration check step process at the DPC. FIG. 16 shows the decryption and validation of an account access response message at the BIA.

Description of the drawings, diagrams, flow charts and the description of the invention, including hardware components, software components, execution modules, databases, connection means, the data transferred between them, and the method of the invention is described in detail as follows.

1.1. BIOMETRIC INPUT APPARATUS (BIA)

1.1.1. Introduction

The BIA is a combination of hardware and software whose job is to gather, encode, and encrypt biometric input for use in providing access to financial services. All actions of the BIA are directed by an outside controlling entity called a terminal, which issues commands and receives results over the BIA's serial line.

BIA hardware comes in two basic versions: standard and ATM. Based on the differences in construction, BIAs vary in their abilities to resist fraud, and so each BIA has a device security assessment value which is set for each BIA of that model type.

BIA software comes in four basic versions: ATM, registration, internal, and issuer. Each software load provides a different, use-specific command set. To provide another layer of security, the DPC knows what software package is loaded into each BIA; any attempts by a BIA to send a message that it is normally not able to send is rejected by the DPC and the event is treated as a major security violation.

An embodiment of the invention detects and combats trojan-horse fraud by limiting the BIA's external interface, by constructing the BIA to make it extremely difficult to tamper with the contents. Each BIA has its unique encryption codes that are known only to the DPC. Each BIA is only allowed to perform operations limited to its designated function. Each biometric input means has a hardware identification code previously registered with the DPC, which makes the biometric input means uniquely identifiable to the DPC in each subsequent transmission from that biometric input device.

The BIA is constructed with the assumption that the controlling terminal is a source for fraud and deception. Terminals range from software applications running on personal computers to dedicated hardware/software systems developed for a particular use such as an ATM. Regardless of the particular model, no BIA reveals unencrypted biometric information. BIA models without display means (such as LCD or LED screens) must reveal selected information (such as private codes) to the terminal for display, and as a result those particular terminal—BIA combinations are considered to be less secure.

No BIA ever discloses any secret encryption codes to any external source.

1.1.2. BIA Models

Particular BIA hardware models have different configurations. They are introduced in brief here:

BIA

Standard model has a computing module, a biometric scanner, display means, communications port, data entry means encased in tamper-resistant case, and electronic tamper detection means.

BIA/ATM

Has heavy-duty scanner and serial port, along with a multichip module. The fact that the display is part of the terminal and not the BIA means lower security because it must reveal the private code to the terminal. Used in ATMs.

1.1.3. BIA Command Set Messages

Each BIA software command set provides a different set of operations. They are introduced briefly here:

BIA/ATM
Account Access
List Accounts
BIA/Internal
Customer Identification
BIA/Issuer
Issuer Batch
BIA/Registration
Customer Identification
Customer Registration
List Accounts

1.1.4. BIA Hardware: Standard Model

The Standard BIA hardware is a multichip module combined with a single-print scanner, a display screen, a serial port, and a PIN pad encased in a hard tamper-resistant case that makes attempts to penetrate obvious while also providing RF shielding for the contents.

The following components are amalgamated into a multichip module, called the BIA Multichip Module (a process for encapsulating several processors in one physical shell, well known in the industry), constructed to protect the communications pathways between the devices from easy wiretapping.

Serial processor
PIN pad processor
LCD screen processor
CCD scanner
A/D processor
High-speed DSP processor containing both flash and mask ROM
General-purpose microprocessor
Standard RAM
EEPROM The following software packages and data are stored in mask ROM. Mask ROM is cheaper than other types of read only memory, but it is easily reverse engineered, and is not electronically erasable. As such we only place the noncritical commonly available code here.

MAC calculation library
DUKPT Key Management library
DES (with CBC) Encryption library
Base-64 (8-bit to printable ASCII) converter library
Embedded Operating System
Serial line device driver
LCD device driver
PIN pad device driver
Scanner device driver
Unique hardware identification code
Multi-Language profiles The following standard data and software packages are stored in flash ROM. Flash ROM is more expensive, but it is much more difficult to reverse engineer, and most importantly, it is electronically erasable. All of the more critical information is stored here. Flash ROM is used in an attempt to increase the difficulty of duplicating a BIA.

Unique DUKPT Future Key Table
Unique 112-bit MAC Key
DSP biometric quality determination algorithm
DSP biometric encoding algorithm
Random number generator algorithm
Command function table The message sequence number, incremented each time a message is sent from the BIA, is stored in the EEPROM. EEPROM can be erased many times, but is also nonvolatile—its contents remain valid across power interruptions The following data is stored in RAM. RAM is temporary in nature, and its contents are lost whenever power is lost.

Encoded Biometric Register
PIN Register
Account Index Code Register
Amount Register
PIN-Block Key
Message Key
Response Key
8 General Registers
stack and heap space Each multichip module contains a "write-once" memory location that is irreversibly set following the initialization of the flash ROM. Whenever an attempt is made to download software to the flash ROM, this memory location is checked; if it is already been set, then the BIA refuses to load. This way, critical software and data keys may only be downloaded once into the device, at the time of manufacture.

All registers and keys are explicitly zeroed when an account access is canceled. Once an account access is completed, registers are cleared as well. Once a "form message" command is executed, biometric, PIN, and account index code registers are also cleared, along with any encryption keys that aren't required for subsequent use.

It is important that the software not keep copies of registers or keys in stack variables.

The following associated hardware components comprise the standard BIA hardware module.

BIA Multichip module
CCD single-print scanner
lighted PIN keypad with auxiliary buttons
2-line 40-column LCD screen
RF shielding
tamper-resistant case
serial connection (up to 57.6 kb)
tamper detection hardware
optional thermite charge attached to Multichip module All temporary storage and internal hardware and software used to calculate these values are secured, which means they resist any attempts to determine their current values, or their means of functioning. This feature is essential for the security of the invention, just as it is critical that the "wiretapping" of a BIA and specifically the gathering of a Biometric-PIN Block for fraudulent means is made as difficult as possible.

The multichip module and the components are, where practical, physically connected to each other without exposed wiring being present.

The enclosure protecting the electronic components of the BIA is welded shut during manufacture; it cannot be opened under any circumstances without significant damage to the case. Upon detecting any opening (or damage) of the enclosure, the BIA performs an emergency electronic zero of any and all keys residing in flash ROM, followed by all of the software libraries. Specific tamper detection methods are kept confidential and proprietary.

In addition to protecting the contents, the case also shields the internal operations from RF signal detectors.

Supersecure versions of the BIA exist whereby tamper detection methods are connected to a mechanism that physically destroys the multichip module as well as the detection methods themselves.

Auxiliary buttons are used to specify particular operations, such as the list accounts operation, or the help operation, to display information that is not generally associated with an account access.

1.1.5. BIA Hardware: ATM Model

The ATM version of BIA hardware is a multichip module combined with a heavy-duty single-print scanner and a serial port. The components are encased in a tamper-resistant case that makes attempts to penetrate obvious while also providing RF shielding for the contents.

This version is designed to be retrofitted into ATM locations. As such, the scanner pad is a heavy-duty sensor pad, and the entire construction makes use of the existing screens and keypads present in the ATM itself.

1.2. BIA SOFTWARE

1.2.1. BIA Software Command Interface

The external interface to the BIA is much like a standard modem; commands are sent to it from a controlling terminal using the external serial line. When a command completes, a response code is sent from the BIA to the terminal. The particulars of the BIA software command interface detailed below illustrate one particular embodiment; other embodiments may mimic popular PIN pad interfaces, such as those manufactured by Verifone, Inc.

Each BIA software load supports a different set of operations. For instance, the ATM load supports Account Access and List Accounts, while a registration load supports Customer Identification and Customer Registration.

All BIA data fields are in printable ASCII, with fields separated by field separator control characters, and records separated by newlines. Encrypted fields are binary converted to 64-bit ASCII using the base-64 conversion library.

Some commands are not available in some configurations. For instance, the ATM BIA cannot "Get PIN", since there is no attached PIN pad. Instead, the ATM BIA supports a "Set PIN" command.

Both the personal ID code and the account index code can be one or more alphanumeric characters, which includes numbers, letters, and other characters. For foreign languages, this includes multiple-character combinations which are used to represent specific words or concepts in that language, such as kanji characters. For BIAs that just have a ten-digit keypad, the codes will simply be numbers as in a standard PIN code, though people may choose to use the standard telephone keypad alphabetic-to-keypad-number translations (e.g. ABC=1, DEF=2, etc.) to help them remember their codes.

1.2.1.1 Response Codes:

Out of time:

The time allotted for the command has expired. A message to that effect will be displayed on the LCD screen, if available. When time expires for a given command, the BIA acts as if the cancel button was pushed.

Canceled:

The "cancel" button has been pushed, and the entire operation has been canceled. This has the side effect of clearing all information which was gathered. A message to that effect will be displayed on the LCD screen, if available.

OK:

The command was successful.

Other:

Each command may have specific other response codes which are valid only for it. These response codes will generally have text accompanying the code, which will be displayed on the LCD screen if it is available.

Message:

This indicates that the command is ongoing, but that the BIA wants to send a message to the terminal with an interim result message. The result is also displayed on the LCD, if available. This facility is used for prompts, as well as status messages.

1.2.1.2 Commands

In the argument list of the commands below, the < > characters surround individual arguments, [ ] characters surround optional arguments, and the | character indicates that a given argument may be comprised of one of the choices presented.

Set Language <language-name>

This command selects from one of a number of different languages encoded within the BIA for prompting for user input.

Get Biometric <time> |primary|secondary]

This command requests the BIA to activate its scanner to get biometric input from the customer, storing it into the Encoded Biometric Register.

First, the message "Please place finger on lighted panel" is displayed on the LCD panel and returned to the terminal. The scanner pad is illuminated, prompting the customer to enter his biometric.

A <time> value of zero means that there is no limit to the time for biometric scan input.

When in scanning mode, a fingerprint scan is taken and given a preliminary analysis by the print quality algorithm. If the scan is not good enough, the BIA continues to take new scans until <time> seconds pass. As time passes and snapshots of the print are taken and analyzed, messages are posted to the LCD screen and sent to the terminal based on the problems detected by the print quality software. If no print of appropriate quality is forthcoming, the BIA returns an error code of time expired, displaying a message to that effect on the LCD.

Once the print quality algorithm affirms the quality of the print scan, the print's minutiae are then extracted by the print encoding algorithm. Only a subset of the minutiae are selected at random, with care taken to retain enough sufficient for identification. These minutiae are then ordered randomly, and are placed in the Encoded Biometric Register, producing a bid biometric sample. Then the BIA responds with the success result code.

If the |primary|secondary] is specified (only available in the Customer Registration command set) then the entire minutiae set is selected, not just the smaller subset, producing a registration biometric sample. Likewise, primary/ secondary biometric selection ends up placing the encoded biometric into the appropriate register.

Whether or not the operation succeeds, as soon as scanning has terminated, the light indicating that scanning is in progress is turned off.

It is important that the same biometric input yields different encodings, so as to complicate the task of anyone attempting to discover the encryption codes of a captured BIA. This is accomplished by the selection of a random subset or random ordering of the encoded biometric, although other methods are possible.

Get PIN <time>

This command requests the BIA to fill the PIN Register by reading from the keypad.

First, the message "Please enter your PIN, then press <enter>" is displayed on the LCD display and sent to the terminal, the appropriate keypad lights are turned on, and then keypad scanning begins.

Scanning terminates when either <time> number of seconds runs out, or when the customer hits the "enter" key.

Note that the digits of the PIN are not displayed on the LCD panel, but for each digit the customer types, a star "*" appears to give the customer feedback. When the "correction" key is pressed, the last digit entered is erased, allowing the customer to fix input mistakes.

When PIN input terminates, the keypad lights turns off

If successful, the command returns OK.

Get Account Index Code <time>

First, the message "Now enter your account index code, then press <enter>" is displayed on the LCD and sent to the terminal. This prompts the customer to enter his account index code. When each key is pressed, that value appears on the LCD panel. The correction button can be pressed to erase one of the values. When the "enter" button is pressed, the Account index code register is set.

During input, the appropriate keypad keys are lit, and when input is concluded, the keypad lights are turned off.

If successful, the command returns OK.

Validate Amount <amount> <time>

The Validate Amount command sends the message "Amount <amount> OK?" to the terminal, and displays it on the LCD screen. If the customer confirms the amount by hitting the "yes" (or enter) button, the Amount Register is set to <amount>. The <amount> value must be a valid number, with no control characters or spaces, etc. During prompting, the yes, no, and cancel buttons are lit. Once prompting is complete, all the lights are turned off. This amount, along with the currency, forms the price information on a financial authorization.

If the customer enters "no", then the account access is canceled.

Enter Amount <time>

The Enter Amount command sends the message "Enter amount" to the terminal, and also displays it on the LCD screen as well. The customer must then enter the dollar amount himself. Each character entered is displayed on the LCD screen. All appropriate buttons are lit. If the enter button is hit, the Amount Register is set to be the value entered on the keyboard. Once entry is complete, all the lights are turned off.

Assign Register <register> <text>

The assign register command sets the designated General <register> to have the value <text>. This is used to set information such as the bank identification code.

Get Message Key

The Get Message Key command causes the BIA to generate a 112-bit random key to be used by the controlling hardware to encrypt any message body that the controlling device wishes to add to the message. That generated key is returned by the BIA in hexadecimal format. The message key is then added to the biometric-PIN block.

Form Message <type=identification|account access . . . >

The form message command instructs the BIA to output a message containing all the information it has gathered. It also checks to make sure that all the registers appropriate to that specific message <type> have been set. If all required registers are not set, the BIA returns with an error. The specific command set software will determine which messages can be formed by that BIA model; all others will be rejected.

Each message includes a transmission code consisting of the BIA's unique hardware identification code and an incrementing sequence number. The transmission code allows the DPC to identify the sending BIA and to detect resubmission attacks.

The BIA uses the DUKPT key management system to select the biometric-PIN block encryption 112-bit DES key from the Future Key Table. This key is then used to encrypt the Biometric-PIN Block using cipher block chaining (CBC). In addition, a response DES key is also generated randomly, and is used by the DPC to encrypt the portions of the response that need to be encrypted.

Note: splitting the response key from the biometric-PIN block key is very important, since each encryption key must be used only within the context of its own responsibilities. That way, if someone were to break the key encoding the private code, it would not result in the disclosure of the biometric-PIN.

The Biometric-PIN block consists of the following fields:

300-byte authorization biometric

4–12 digit PIN 112-bit response key

[optional 112-bit message key]

Note that the message key is only present if the controlling terminal has requested a message key for this message. It is up to the controlling terminal to encrypt any message body attached to the financial authorization request using the message key.

Once all encryption is complete, the BIA outputs the body of the appropriate request message (such as a Financial authorization Request message), terminated by and protected with the Message Authentication Code (MAC).

The MAC field is calculated using the BIA's secret 112-bit DES MAC key, and covers all message fields from first to last. The MAC assures the DPC that nothing in the message has changed effectively sealing the message, while still allowing the plaintext fields to be inspected by the controlling terminal.

When the Form Message command is done, the BIA sends the message "I'm talking to DPC Central" to the terminal as well as displaying it on the LCD screen, indicating that work is proceeding on the request.

The command returns OK in addition to returning the entire formed message upon completion of the command.

Show Response <encrypted response> <time>

The Show Response command instructs the BIA to use its current Response Key to decrypt the response from the system.

After decryption, a chime sounds or the PIN pad light flashes, and the private code is displayed on the LCD screen for <time> seconds. At no time does this command transmit the decrypted private code to the controlling terminal.

Any other information located in the response message is returned to the terminal.

Reset

The Reset command instructs the BIA to clear all temporary registers, the LCD screen, all temporary Key registers, and to turn off all keypad lights that may be on.

Set PIN <value>

This command assigns the BIA's PIN Register to be <value>.

Note that allowing a non-secured device to provide the PIN is a potential security problem, because non-secured devices are much more vulnerable to wiretapping or replacement.

Set Account index code <value>

This command assigns the BIA's Account index code Register to be <value>.

Note that allowing a non-secured device to provide the account index code is a potential security problem, because non-secured devices are much more vulnerable to wiretapping or replacement.

Set Amount <value>

This command assigns the BIA's Amount Register to be <value>.

Decrypt Response <encrypted response message>

The Decrypt Response command instructs the BIA to use its current Response Key to decrypt the encrypted portion of the response message. Once decrypted, the response is returned to the controlling device, presumably for display on the ATM terminal's LED screen.

Note that providing this decryption ability is a security problem, as once the plaintext leaves the BIA, the terminal has the ability to do with it what it will.

1.2.2. BIA Software: Support Libraries

The BIA software is supported by several different software libraries. Some of them are standard, generally available libraries, but some have special requirements in the context of the BIA.

1.2.2.1. Random Number Generator

Since the BIA is constantly selecting random DES keys for use in the message body and message response encryption, it is important that the keys selected be unpredictable keys. If the random number generator is based on time of day, or on some other externally-predictable mechanism, then the encryption keys will be much more easily guessed by an adversary that happens to know the algorithm. The security of the encryption techniques used in the BIA assumes that both the random number generator algorithm as well as the encryption algorithms are both publicly known.

One such random number algorithm for generating DES keys is defined in ANSI X9.17, appendix C.

1.2.2.2. DSP Biometric Encoding Algorithms

The biometric encoding algorithm is a proprietary algorithm for locating the minutiae that are formed by ridge endings and bifurcations on human fingertips. A complete list of minutiae is stored in the DPC as a reference, while only a partial list is required by the algorithm when performing a comparison between an identification candidate and a registered customer.

During both Customer Registration as well as identification, the encoding algorithm must find a reasonable number of minutiae points. Otherwise, the BIA will ask for the biometric to be re-entered.

1.2.2.3. Operating System and Device Drivers

The BIA is a real-time computing environment, and as such requires a real-time embedded operating system to run it. The operating system is responsible for taking interrupts from devices and scheduling tasks.

Each device driver is responsible for the interface between the operating system and the specific hardware, such as the PIN pad device driver, or the CCD Scanner device driver. Hardware is the source for events such as "PIN pad key pressed," or "CCD Scanner scan complete". The device driver handles such interrupts, interprets the events, and then takes action on the events.

1.2.2.4. DES Encryption Library

There are any number of DES implementations publicly available. DES implementations provide a secret key-based encryption from plaintext to ciphertext, and decryption from ciphertext to plaintext, using 112-bit secret keys.

1.2.2.5. DUKPT Key Management Library

The derived unique key per transaction key (DUKPT) management library is used to create future DES keys given an initial key and a message sequence number. Future keys are stored in a Future Key Table. Once used, a given key is cleared from the table. Initial keys are only used to generate the initial future key table. Therefore the initial key is not stored by the BIA The use of DUKPT is designed to create a key management mechanism that provided a different DES key for each transaction, without leaving behind the trace of the initial key. The implications of this are that even successful capture and dissection of a given future key table does not reveal messages that were previously sent, a very important goal when the effective lifetime of the information transmitted is decades. DUKPT is fully specified in ANSI X9.24.

DUKPT was originally developed to support PIN encryption mechanisms for debit card transactions. In this environment, it was critical to protect all transactions. An assumption is made that an adversary records encrypted transactions for a six month period, and then captures and successfully extracts the encryption code from the PIN pad. The adversary could then manufacture one new counterfeit debit card for each card used during that six month period. Under DUKPT, however, the adversary's theft and reverse engineering would not allow him to decrypt previous messages, although new messages would still be decryptable if the adversary were to replace the PIN pad subsequent to reverse engineering.

In the biometric-PIN situation, the adversary has an even harder time, as even if messages are decrypted, turning a digital biometric-PIN into a physical fingerprint is much harder than turning an account number-PIN into a plastic card, which is one of the significant benefits of the tokenless system.

Still, if an adversary can decrypt, he can encrypt, which might allow him to electronically submit a biometric-PIN to the system to authorize a fraudulent account access. While this is quite difficult, it is still best to restrict the options available to the adversary as much as possible, hence the use of DUKPT.

1.3. BIA Software Command Sets

1.3.3. BIA Software: Registration Command Set

The BIA/Reg software interface exports an interface that allows general-purpose computers to interact with the system to identify and register customers. The following operations are supported:

Customer Identification
Customer Registration
List Accounts

In order to support those operations, the BIA/Reg provides the following command set:

Set Language <language-name>
Get Biometric <time> [primary|secondary]
Get PIN <time>
Assign Register <register> <text>
Get Message Key
Form Message <type>
Show Response <encrypted response> <time>
Reset

1.3.6. BIA Software: Issuer Command Set

The BIA/Iss software interface exports an interface that allows general-purpose computers to interact with the system to authenticate and submit batch change requests. The following operation is supported:

Issuer Batch

In order to implement this operation, the BIA/Iss provides the following command set:

Set Language <language-name>
Get Biometric <time> [primary|secondary]
Get PIN <time>
Assign Register <register> <value>
Get Message Key
Form Message <type>
Show Response <encrypted response> <time>
Reset

1.3.7. BIA Software: Internal Command Set

The BIA/Int exports a command set that allows general-purpose computers to interact with the system to identify customers. The following operation is supported:

Customer Identification

In order to implement this operation, the BIA/Int provides the following command set:

Set Language <language-name>
Get Biometric <time>
Get PIN <time>
Assign Register <register> <value>
Get Message Key
Form Message <type>
Show Response <encrypted response> <time>
Reset

1.3.8 BIA Software: ATM Command Set

The BIA/ATM software interface exports a command set that allows ATMs to identify customers. The following operation is supported:

Account Access
List Accounts

In order to implement this operation, the BIA/ATM provides the following command set:

Get Biometric <time>
Set PIN <text>
Set Account index code <text>
Assign Register <register> <value>
Form Message <type>
Decrypt Response <encrypted response message>
Reset

1.4. TERMINALS

1.4.1. Introduction

The terminal is the device that controls the BIA and connects to the DPC via modem, X.25 packet network, telephone network, the Internet, a private intranet, or even a Cable TV network, or some other mechanism for digital networking that is well-known in the industry. Terminals come in different shapes and sizes, and require different versions of the BIA to perform their tasks. Any electronic device that can issue commands to and receive results from the biometric input device is considered to be a terminal.

Some terminals are application programs that run on a general-purpose microcomputer, while other terminals are combinations of special purpose hardware and software.

While the terminal is critical for the functioning of the system as a whole, the system itself places no trust in the terminal whatsoever. Whenever a terminal provides information to the system, the system always validates it in some manner, either through presentation to the customer for confirmation, or by cross-checking through other previously registered information.

While terminals are able to read some parts of BIA messages in order to validate that the data was processed properly by the BIA, terminals cannot read biometric identification information including the biometric, the PIN, encryption keys, or account index codes.

Specific BIAs export some security functionality to the terminal, such as PIN entry, and private code display. As a result, such devices are regarded as somewhat less secure than their entirely self-contained counterparts.

There are many different terminal types; each is connected to a specific model BIA. Each terminal is described in brief below:

ATM (Automated Teller Machinery)

Integrated BIA/ATM with ATM software load provides biometric-PIN access to ATM cash dispensers.

CRT (Customer Registration Terminal)

Standard BIA with Registration software load attached to a microcomputer provides banks with the ability to register new customers with the system along with their financial accounts and other personal information.

CST (Customer Service Terminal)

Standard BIA with Internal software load attached to a microcomputer system authorizes employees to construct database requests for the purposes of customer service.

IT (Issuer Terminal)

Standard BIA with Issuer software load attached to a microcomputer provides banks with the ability to send batched changes of financial accounts to the DPC.

1.4.5. Terminal: Customer Registration 1.4.5.1. Purpose

The purpose of the Customer Registration Terminal (CRT) is to register new customers including their biometric-PIN, mailing address, private code, and a list of financial accounts and account index codes that they can access, all using their biometric-PIN.

The objective of the enrollment process is to obtain personal information from a customer at the location of a responsible institution where that information can be validated. This includes, but is not limited to retail banking outlets and credit card issuers. Each participating responsible institution has on or more CRTs that are used by employees who have been authorized to perform registrations. Each employee is accountable for each customer registered.

1.4.5.2 Construction

The CRT consists of:

an microcomputer and screen, keyboard, mouse a BIA/Reg 9.6 kb modem/X.25 network connection a Customer Registration software application The CRT uses an attached BIA/Reg for biometric entry, and is connected to the system by a 9.6 kb modem or an X.25 network connection. Customer Registration terminals are located in places that are physically secure such as retail banking outlets.

1.4.5.3. Identification

Three entities need to be identified for the DPC to respond positively to a BIA/Reg registration request: the registering employee, the institution, and the BIA/Reg. The employee must have been authorized to register customers for that institution.

The institution and the BIA are identified by cross-checking the owner of the BIA with the institution code set by the CRT. The employee identifies himself to the system by entering his biometric-PIN upon starting the registration application.

The institution uses its standard customer identification procedure (signature cards, employee records, personal information, etc.) before registering the customer on the system. It is important for the institution to verify customer identity as assiduously as possible, since the registering customer will be empowered to access accounts and transfer money from those accounts at will.

1.4.5.4. Operation

During registration, the customer enters both a primary and secondary registration biometric sample. The customer must use both index fingers; if the customer is missing index fingers, the next inner-most finger may be used. Requiring specific fingers to be used (such as the index finger) allows the prior fraud re-registration check to work.

The customer is encouraged to select a primary and a secondary finger; the primary finger is given preference during the DPC identity check, so the customer should present the most-often used finger as the primary. Of course, the DPC could choose to alter the designation of primary and secondary biometrics based on operations if it turns out to be important to do so.

As a part of the biometric encoding process, the BIA/R determines if the customer has entered "a good print." If the print is not good, the BIA/R will prompt the customer to re-enter the biometric until a good print is obtained.

The customer selects a PIN of from four to twelve digits from a series of PIN options provided by the system's central database. However, the PIN must be validated by the system. This involves two checks: one, that the number of other customers using the same PIN aren't too great (since the PIN is used to reduce the number of customers checked by the biometric comparison algorithm), and that the customer's registration biometric sample being registered isn't too similar to other customer's biometrics stored within the same PIN group. If either happens, the enrollment is rejected, an error message is returned to the CRT, and the customer is instructed to request a different PIN. The system may optionally return with an "identical match" error condition, which indicates that the customer already has a record in the system under that PIN.

A PIN of 0 allows the system to assign a PIN to the customer.

The customer constructs a confidential private code consisting of a word or phrase. If the customer does not wish to construct one, a private code will be constructed randomly by the terminal.

The customer may also arrange their financial account code list. This list describes which account index code points at which account (i.e. 1 for debit, 2 for credit, 3 for emergency account index code linked to debit, etc.). For checking and savings accounts, the registering institution must be the bank or financial institution that provides the accounts. The customer signs an agreement allowing the system to access their accounts when they present their biometric-PIN.

Even after registration, a customer is not actually able to perform operations using the system until a prior fraud re-registration check is completed. This generally takes a few minutes, but during times of high load, it takes up to several hours. Only if the system finds no instance of prior fraud is the customer's access activated.

In an alternate embodiment, relatively low security registrations are accomplished at places such as supermarkets, over the Internet, or at unattended kiosks. Registrations at such places must be subsequently confirmed by a telephone call to the registering customer using a telephone number gathered from credit or bank account records, or by sending a letter to the registering customer's mailing address (also gathered from bank or credit account records) requiring him to call back and confirm the registration. The ability to authorize account accesses will only be enabled once registration is confirmed.

If a financial account number is registered without the participation of the issuing institution, the financial account owner must sign an agreement at the time of registration authorizing the release of funds whenever an account access is received by the system that is properly authorized using his biometric and PIN. Of course, confirmation of identity is still required to validate the signature, either through a telephone contact or an in-person examination of the registrant's identity documents. This confirmation is required in order to prevent customers from registering other people's financial account numbers under their own biometric and PIN.

If a customer does manage to register another customer's financial accounts and make use of them for a period of time, once detected, the customer's ability to authorize account accesses will be disabled, and the customer will be added to the prior fraud database preventing the customer from re-registering until the matter is cleared up.

1.4.5.5. Security

If a customer is found to have defrauded the system, the DPC institutes a database-wide involuntary biometric database search for the customer. Several of these are performed each night, so customers who are particularly wanted by the system can thus be winnowed out of the database by using a time consuming process during conditions of light activity.

The employees performing the registration operation identify themselves using biometric-PIN only when initially activating the registration system. This is a convenience for the employee, but a possible security problem for the system, as unattended or "temporarily borrowed" CRTs could be the source for fraud. As a result, the registration application exits after a predetermined period of no activity.

1.4.6. Terminal: Customer Service 1.4.6.1. Purpose

The purpose of the customer service terminal (CST) is to provide internal DPC support personnel access to the various aspects of the system databases. Support people need to answer inquiries by customers, issuers, institutions, and banks that are having trouble with the system. Customers may wish to change mailing information, or even their PIN.

1.4.6.2. Construction

The CST consists of:

a microcomputer a BIA/Int ethernet/token ring/FDDI network interface a database examination and modification application Each CST is connected to the system via a high speed local area network connection such as token ring, Ethernet, fiber (FDDI), etc. Each CST has the capability to query each of the databases, and display the results of these queries. However, the CST only displays fields and records based on the privilege of the terminal user. For instance, a standard customer service employee won't be able to see the encryption code for a given BIA's VDB record, though they can see who currently owns that BIA.

1.4.6.3. Identification

For the CST to allow access to the database, the user and the BIA must be identified by the system. In addition, the employee's privilege level must also be determined, so that the database can restrict access appropriately.

1.4.6.4. Operation

An employee using a CST starts a session by providing identification by entering their biometric-PIN. The BIA constructs an Identification Request message, and send it to the DPC for verification. Once the system verifies the employee, the CST application can operate normally, though limited by the employee's previously assigned DPC privilege level.

1.4.6.5. Security

For security purposes, the DPC will terminate a connection to the CST application after a predetermined idle time period.

It is important that the database application cannot be modified in any manner; either deliberately, or through an unintentional introduction of a virus. To that end, CSTs do not have any floppy drives or other removable media. Furthermore, read access to the database application executable is strictly limited to those with a need to know.

In order to protect the communications between the CST and the database from surreptitious modification or disclosure, the CST encrypts all traffic between the CST and the database. To do this, the CST generates a session key that is sent to the server during the login session with the system. This session key is used to encrypt and decrypt all communications with the DPC that occur during the period.

Even assuming secure communications and no modified database applications, the DPC makes certain that DPC data fields that are not accessible to the individual operating the CST are not sent to the CST's database application. Likewise, at no time do any CST personnel have access to or permission to modify customer biometric information.

The DPC and the support center can be co-located, or because of the fairly tight security surrounding the CST itself, the support center can be split off on its own.

1.4.7. Terminal: Issuer 1.4.7.1. Purpose

The purpose of the issuer terminal is to allow employees at issuing banks to submit batch financial account modification operations to the DPC in a secure and identifiable manner.

1.4.7.2. Construction

The IT consists of:

a microcomputer a modem, X.25 network, or Internet connection to the system a BIA/Iss a network connection to the bank's internal network The Issuer Terminal uses an issuer BIA to authorize mass additions and deletions of financial account information.

1.4.7.3. Identification

In this operation, the bank must be identified, a properly authorized bank employee must be identified, and all of the customers whose financial accounts are being added or removed must also be identified.

The bank is responsible for identifying the customers who wish to add their financial accounts at that bank to their financial account list. As in Customer Registration, this is done by the bank using signature cards and personal information. The DPC identifies the bank by cross-checking the issuer code submitted by the IT with the issuer code registered in the VAD record of the BIA/Iss. A biometric-PIN is used to identify the bank employee actually submitting the batch.

1.4.7.4. Operation

In order to add a financial account, a customer gives his biometric identification number to the bank (the identification number is given to the customer during the initial Customer Registration step) along with the financial accounts that are to be added. After the customer is properly identified, this identification code and financial account list are forwarded to the IT for subsequent batch submission to the system.

Whenever deemed appropriate by the bank, an authorized employee at the bank instructs the IT to upload the batched financial account additions/deletions to the DPC. To do this, the authorized employee enters his biometric-PIN, the IT adds a session key, adds the bank's issuer code, and from that the BIA/Iss constructs an Issuer Batch Request message that the IT then forwards to the DPC. The IT encrypts the batch using the message code, and then sends that as well.

When the system receives the Issuer Batch Request, it validates that the BIA is a BIA/Iss, that the BIA/Iss is registered to the bank claimed by the issuer code, and that the employee identified in the biometric-PIN is allowed to submit batch requests to the DPC for that bank. If so, the DPC processes all the requests, keeping track of errors as required. Once done, the DPC returns the employee's private code, along with an encrypted batch containing any errors that occurred during processing.

1.4.7.5. Security

Securing this account access is critical for the security of the system. An adversary intent on fraud need only find a way to add other people's financial accounts to his biometric identification code and can then commit fraud at will. Eventually the adversary is caught, and purged from the database, but only after other people's financial accounts are drained by the adversary.

Encryption guarantees that the transmission between bank and DPC cannot be intercepted, and thus financial account numbers are protected in transit.

Cross-checking the bank with the BIA/Iss means that both the IT and the BIA must be compromised to submit false add/delete messages to the DPC. Thus, the bank must ensure that the IT is physically secure, and that only authorized employees are allowed to access it.

Requiring an employee to submit the batch ensures that a responsible employee is "in the loop" to make sure that proper bank security measures have been followed in the construction and submission of the batch.

1.4.8. Terminal: Automated Teller Machinery
1.4.8.1. Purpose

The purpose of the biometric ATM is to provide customers access to cash and other ATM functions without having to use an debit card. It does this by submitting a biometric-PIN and an account index code and retrieving a financial account number. For users of the system, this replaces the ATM card+PIN mechanism as a method for identifying the financial account and authorizing the customer. It is assumed that all ATMs still continue to accept ATM cards.

1.4.8.2. Construction

The ATM consists of:

a standard ATM an integrated BIA/ATM (scanner only)

a connection to the DPC

The biometric ATM uses an integrated BIA/ATM to identify customers and allow them access to financial accounts using a biometric-PIN and an account index code. A BIA/ATM is installed into the ATM, making use of the ATM's current PIN pad for PIN and account index code entry. The ATM is connected to the system using its standard debit network connection.

The BIA/ATM is structured in such a way as to make integration with an existing ATM network as simple as possible. This results in a compromise between security and ease of integration.

1.4.8.3. Identification

Three entities need to be identified for the DPC to respond properly to a BIA/ATM account request: the customer, the bank, and the BIA/ATM.

The bank is identified by cross-checking the ATM's stored bank code with the BIA/ATM's bank code. The BIA/ATM is identified by successfully locating the BIA/ATM in the VAD, and the customer is identified through the standard biometric-PIN.

1.4.8.4. Operation

To access an ATM, a customer enters their biometric-PIN into the BIA along with the account index code. The BIA forms an account access request message, which is then sent to the DPC by the ATM. The DPC validates the biometric-PIN as well as the account index code, and then sends the resulting financial account number along with the private code back to the ATM.

The ATM asks the BIA to decrypt the response, and then displays the private code on the ATM's display screen. In addition, the ATM also examines the response to see whether or not the customer has caused a silent alarm to be raised during the account access. If a silent alarm was raised, the ATM may provide false or misleading information as to the amounts available to the customer; it may dispense marked bills, or notify the authorities, or capture full motion video and audio at the ATM; the specifics of the response to a silent alarm will vary from ATM to ATM. Optionally, the DPC can send a different or false private code to be presented to the customer.

Once the account number has been received by the ATM, the customer performs financial operations using that and related financial accounts with the ATM, requesting cash, depositing funds, transferring funds, inquiring about account balances, and so on.

1.4.8.5. Security

Messages between the ATM and the DPC are secured by encryption and MAC calculation from the BIA. The MAC means that the ATM cannot change the contents of the message without being detected, and encryption prevents the encrypted part of the message from being disclosed.

Because the BIA/ATM has no LCD or no PIN pad attached, it requires the ATM to provide all the text prompts and to gather all the input from the customer. This is less secure than if the BIA were performing the operation, but as ATMs are quite physically robust, the resulting security is at least equivalent.

1.4.8.6. Notes

It is between the bank and the customer to specify the behavior of an ATM when the customer raises a silent alarm. A particular bank may choose to place artificial financial resource limits on the accounts, alter balance information, or a false screen may be displayed. A false screen is a display of data which has been intentionally pre-determined to be inaccurate such that a coercing party will not be able to obtain accurate data about a customer's financial accounts.

1.5. SYSTEM DESCRIPTION: DATA PROCESSING CENTER

1.5.1. Introduction

The Data Processing Center (DPC) handles account accesses and customer registration as its main responsibilities.

Each DPC site is made up of a number of computers and databases connected together over a LAN as illustrated in the DPC Overview (FIG. 2). Multiple identical DPC sites ensure reliable service in the face of disaster or serious hardware failure at any single DPC site. Furthermore, each DPC site has electrical power backup and multiple redundancy in all of its critical hardware and database systems.

DPC components fall into three categories: hardware, software, and databases. Below is a short description, by category, of each component. More detailed descriptions appear in the following sections.

1.5.1.1. Hardware

FW

Firewall Machine: the entry point of the DPC site.

GM

Gateway Machine: the system coordinator and message processor.

DPCLAN

DPC Local Area Network: connects the DPC sites 1.5.1.2. Databases

IBD

Individual Biometric Database: identifies customers from their biometric and PIN code.

PFD

Prior Fraud Database: lists customers who have defrauded the system and can check if a biometric matches any of these customers.

VAD

Valid Apparatus Database: stores information required to validate and decrypt BIA messages.

AOD

Apparatus Owner Database: stores information about the owners of BIA devices.

ID

Issuer Database: identifies issuing banks that participate with the system.

AID

Authorized Individual Database: stores the list of people allowed to use personal or issuer BIA devices.

1.5.1.3. Software

MPM

Message Processing Module: handles the processing of each message by coordinating with the other software modules and databases required to perform the message's task.

SNM

Sequence Number Module: handles DUKPT sequence number processing.

MACM

Message Authentication Code Module: handles MAC validation and generation.

MDM

Message Decrypt Module: handles encrypting and decrypting of BIA requests and responses.

PGL

PIN Group List: handles the lookup of PIN groups by PIN and the configuration of database elements that depend on the list of PIN groups.

IML

IBD Machine List: handles the lookup of the main and backup database machines dedicated to holding IBD records for a given PIN group.

1.5.1.4. Terminology

When defining database schema, the following terminology is used for describing field types:

| int<X> | an integral type using <X> bytes of storage |
|---|---|
| char<X> | a character array of <X> bytes |
| text | a variable length character array |
| <type>[X] | a length <X> array of the specified type. |
| time | a type used for storing time and date |
| biometric | a binary data type used for storing the biometric |

When describing database storage requirements, the term "expected" means the expected condition of a fully loaded system.

1.5.2. Protocol Description

Terminals accomplish their tasks by sending request packets to a DPC site. The DPC site sends back a response packet containing the status on the success or failure of the request.

Communication is via a logical or a physical connection-oriented message delivery mechanism such as X.25 connections, TCP/IP connections, or a telephone call to a modem bank. Each session holds the connection to the terminal open until the DPC sends its response back to the terminal.

The request packet contains a BIA message part and a terminal message part:

BIA message part protocol version message type 4-byte hardware ID 4-byte sequence number <message specific data>

Message Authentication Code (MAC)

Terminal message part

<terminal specific data>

The BIA message part is constructed by a BIA device. It includes one or two biometrics, a PIN, authorization amounts, and the contents of the general registers which are set by the terminal. Note: the MAC in the BIA message part only applies to the BIA part and not to the terminal part.

A terminal may place additional data for the request message in the terminal message part. The BIA provides a message key to allow the terminal to secure the terminal part data. The BIA automatically includes the message key in the packet's encrypted biometric-PIN block when necessary. The terminal performs the message key encryption itself, however.

The response packet contains a standard header and two optional free-form message parts: one with a MAC and one without:

Standard Header protocol version message type 4-byte hardware ID 4-byte sequence number <message specific data>

MAC

Optional Free-form message part without MAC

<additional message specific data>

The message part with a MAC is sent to the BIA so that it may validate that this part of the response has not been tampered with and to display the customer's private code. The message part without a MAC is used for transmitting large amounts of data that are not sent to the BIA for MAC validation as the BIA to terminal connection may be of limited bandwidth.

1.5.3. Processing Packets

In an embodiment of the invention with multiple DPC sites, a terminal need only send its request to one of the DPC sites, typically the closest, because that site automatically handles updating the others by running distributed requests as necessary.

When one of the DPC's Firewall Machines receives a packet, it forwards it to one of the Gateway Machines for the actual processing. Each GM has a Message Processing Module that handles the coordination between the DPC components required to process the request and sends the response back to the sender.

1.5.4. Validating and Decrypting Packets

All packets the DPC receives, with the exception of those not constructed by a BIA, contain a BIA hardware identification code (the BIA Identification of the packet), a sequence number, and a Message Authentication Code (MAC). The GM asks the MAC Module to validate the packet's MAC and then checks the sequence number with the Sequence Number Module. If both check out, the GM passes the packet to the Message Decrypt Module for decryption. If any one of the checks fail, the GM logs a warning, terminates processing for the packet, and returns an error message to the BIA device.

1.5.5. Response Packets

Each packet the DPC receives may contain an optional response key stored in the encrypted biometric-PIN block of the packet. Before the DPC replies to a request that includes a response key, it encrypts the response packet with the response key. It also generates a Message Authentication Code and appends it to the packet.

The only exception to encrypting response packets applies to error messages. Errors are never encrypted and never include confidential information. However, most response packets include a status or response code that can indicate whether the request succeeded or not. For example, when the DPC declines a credit authorization, it does not return an error packet, it returns a normal account access response packet with a response code set to "failed".

1.5.6. DPC Procedures

The DPC has three procedures commonly used while processing requests.

1.5.6.1. Customer Identification Procedure

For requests that require the DPC to identify a customer, the DPC executes the following procedure using the personal authentication information in the request (the bid biometric and the PIN): using the PIN code, the DPC searches the IBD Machine List for the main and backup IBD machines responsible for handling identifications for the given PIN code. Next, the DPC sends the identification request to either the main or backup machines depending on which is the least loaded. The IBD machine responds with the IBD record for the customer or an "customer not found" error.

The IBD machine retrieves all the IBD records for the given PIN. Using a proprietary biometric hardware device, the IBD machine compares each record's primary registered biometric sample with the customer's bid biometric sample arriving at a comparison score indicating the similarity of the two biometrics. If no biometric has a close enough comparison score, the comparisons are repeated using the registered secondary biometric samples. If none of the secondary biometric have a close enough comparison score, then the IBD machine returns a "customer not found" error. Otherwise, the IBD machine returns the full IBD record of the customer, from which such fields such as the private code, financial account numbers, and so on may be obtained.

The IBD machine maintains a circular queue of the most recently submitted bid biometric samples for each IBD record. If a bid biometric sample exactly matches a sample on the queue, the DPC can assume that the customer's biometric sample may have been stolen. If this happens repeatedly, the DPC will suspend the customer's ability to authorize account accesses and generate a security violation message. When contact is made with the customer, the DPC will allow the customer to select a new PIN, thus resolving the issue.

1.5.6.2. Silent Alarm Procedure

For requests that include an account index code, the DPC handles the case where the customer chooses his or her emergency account index code. This is known as the emergency check. The GM processing the request immediately logs a warning, and if the response packet has a response code and the IBD silent alarm procedure code instructs it to forward the silent alarm to the bank, sets the response code to "silent alarm".

Other behavior during a silent alarm is governed by the IBD record's silent alarm code field. This includes forwarding silent alarms to local authorities or rejecting account accesses altogether. The DPC also increments the silent alarm use count of the customer's IBD record whenever the emergency account index code is used.

It is the responsibility of the owner of the BIA device that submitted the request to watch for an "silent alarm" response code and provide further action, such as the false screen mechanism described in the ATM terminal section.

If the PIN entered by the customer is the emergency PIN, the silent alarm procedure is also followed.

1.5.6.3 Security Factor Module

Before each request can be executed, the DPC performs a security factor assessment on the request to determine if the request has a high probability of having been fraudulently generated.

Each entry in the VAD has information on the number of recent requests submitted, the number of recent requests that have failed, the device security assessment, whether or not the device is attended along with the fraud detection skill of the attendant, and lastly the security problems associated with the physical location of the device itself (i.e. low or high crime area, etc.). The local time of day is also added into the equation. Other factors can be added as necessary. The result of the calculation is a number indicating the relative confidence that the account access is legitimate.

Once the security factors assessment is done, account accesses that are rated below a particular value are rejected as possible security problems. Account accesses that are rated below a second and lower value are rejected as probable violations, and the account access is noted in the DPC security log.

Whenever a customer identification fails, the VAD record for the device is updated appropriately. Too many failures, and the Security Factor Module will take the device out of service, refusing any further account accesses from that device until a service representative places it back in service.

1.5.7. Protocol Requests

The following sections describe each protocol request/ response and the actions the DPC takes to perform them.

The list of protocol packets are:
Customer Identification
Registration
Access
Issuer Batch 1.5.7.1. Customer Identification
Customer Identification Request
BIA Part:
protocol version
message type
4-byte hardware ID
4-byte sequence number
encrypted(DUKPT key) Biometric-PIN block:
300-byte authorization biometric
4-12 digit PIN
112-bit response key
MAC
Terminal Part: (not used)
Customer Identification Response
protocol version
message type
4-byte hardware ID
4-byte sequence number
hardware encrypted(response key):
private code text
status code (OK or fail, silent alarm, etc.)
customer name
biometric identification code
MAC The Customer Identification request includes a biometric-PIN block which the DPC uses with the customer identification procedure to identify the customer. If the customer is identified, then the DPC responds with the customer's name, biometric identification, and private code. Otherwise, the DPC responds with an "unknown customer" error.

If the PIN entered by the customer matches the emergency PIN, the silent alarm procedure is also followed.

1.5.7.3. Registration
Registration Request
BIA Part:
protocol version
message type
4-byte hardware ID
4-byte sequence number
encrypted(DUKPT key) Biometric-PIN block:
1000-byte primary registration biometric
1000-byte secondary registration biometric
4-12 digit PIN
112-bit response key
112-bit message key
MAC
Terminal Part:
encrypted(message key):
name
address
zipcode
private code
financial account list (account index code, financial account #)
emergency account index code, account index code
silent alarm behavior
Registration Response
protocol version
message type
4-byte hardware ID
4-byte sequence number
encrypted(response key):
private code text
PIN
biometric identification code
list of DPC chosen PINs (if original choice of PIN is rejected)
status code (OK, fail, etc.)
MAC Customers register with the DPC via a Customer Registration Terminal (CRT). The CRT sends the DPC a registration packet containing primary and secondary biometric and personal identification number, along with ancillary data such as the customer's name, address, a list of financial accounts, the private code, and the emergency account index code. Optionally, the customer may include a Social Security Number (or "SSN"). The customer may choose his or her own PIN code or allow the system to choose it. In a modification step any previously entered data can be modified or deleted.

At any given moment, only one DPC site acts as the registration site, for implementation simplicity. Registration request packets received by non-registration DPC sites are forwarded to the current registration site. The registration DPC site performs the entire registration check, assigning of IBD records to IBD machines, and the distributed transaction required to update all other DPC sites.

The registration DPC site selects the PIN code for registration requests that don't specify one, stores the IBD record on the main and backup IBD machines (as specified in the PIN Group List), and checks the PIN and biometric suitability of the registration packet before running the distributed transaction to update the other DPC sites.

The DPC runs a personal identification number and biometric sample duplication check step wherein the biometric and personal identification number gathered during the registration step is checked against all previously registered biometrics currently associated with the identical personal identification number. The DPC may reject the registration for the following reasons: the PIN code is too popular, or the biometrics are too similar to other biometrics stored under the chosen PIN. To aid the customer in choosing an acceptable PIN, the DPC generates a short list of PIN codes for which the registration will be guaranteed that it reserves for a period of time. The CRT then prompts the customer for a new PIN which may be chosen from the good PIN list.

1.5.7.4. Account Access
Account Access Request
BIA Part:
protocol version
message type
4-byte hardware ID
4-byte sequence number
encrypted(DUKPT key) Biometric-PIN block:
300-byte authorization biometric
4-12 digit PIN
112-bit response key
[optional 112-bit message key]
account index code
MAC
Terminal Part: (not used)
Account Access Response
protocol version message type
4-byte hardware ID
4-byte sequence number
encrypted(response key):
private code text
[optional PIN]
financial account number
status code (OK or fail, silent alarm)
MAC The access request allows BIA-equipped terminals to provide a safer and more convenient way for customers to identify themselves to the ATM.

The GM identifies the customer by the packet's biometric-PIN and uses the specified account index code to choose which financial account number to retrieve.

When the GM looks up the customer's financial account using the account index code of the request, the chosen financial account may be the emergency account index code. If this happens, the GM follows the silent alarm procedure. Additionally, if the PIN entered by the individual is the emergency PIN, the silent alarm procedure is also followed.

1.5.7.5. Issuer Batch
Issuer Batch Request
BIA Part:
protocol version
message type
4-byte hardware ID
4-byte sequence number
encrypted(DUKPT key) Biometric-PIN block:
300-byte authorization biometric
4–12 digit PIN
112-bit response key
112-bit message key
issuer code
MAC
Terminal Part:
encrypted(message key)
add <biometric Id> <account index code> <financial account> [<silent alarm flag>]
remove <biometric Id> <account index code> <financial account>
Issuer Batch Response
protocol version
message type
4-byte hardware ID
4-byte sequence number
encrypted(response key):
private code text
status code (OK or fail, silent alarm, etc.)
MAC
encrypted(message key) failed list:
failed <command> <code>

The Issuer Batch request allows an issuing bank or other authority to perform routine maintenance on the Individual Biometric Database. The DPC logs a security violation warning if it receives any Issuer Batch requests from non-issuer BIA devices, and it also refuses to process the request.

The DPC identifies the employee submitting the batch request by following the customer identification procedure. The DPC then checks that the employee is registered in the Authorized Individual Database to use the BIA device embedded in the sending Issuer Terminal.

The DPC also uses the issuer code in the request to look up the apparatus owner Identification in the Issuer Database and compare it against the apparatus owner Identification stored in the Valid Apparatus Database to ensure that the issuer code is not forged.

The DPC then executes the add and delete commands in the message-key encrypted batch list. The batch list is a newline separated list of commands. Valid commands are:
add <biometric Id> <account index code> <financial account> [<silent alarm>]

The add command adds the financial account to the financial account list at the specified account index code. The optional silent alarm flag indicates whether the particular account index code is treated as the customer's emergency account index code. If the financial account currently stored in the financial account list does not belong to the issuer, the command fails. This feature prevents one bank from adding or removing financial accounts from other bank's customers without the customer's knowledge or authorization.

remove <biometric Id> <account Index code> <financial account>

The remove command clears the customer's financial account stored at the specified account index code in the financial account list. If the financial account currently stored in the financial account list does not match the financial account the issuer is attempting to remove, the command fails.

For each command in the batch that failed to execute correctly, the GM logs a security violation warning and appends an entry to the failed list of the response. The failed entry includes the text for the command and the error code.

1.5.7.7. List Accounts
List Accounts Request
BIA Part:
protocol version
message type
4-byte hardware ID
4-byte sequence number
encrypted(DUKPT key) Biometric-PIN block:
300-byte authorization biometric
4–12 digit PIN
112-bit response key
MAC
Terminal Part: (not used)
List Accounts Response
protocol version
message type
4-byte hardware ID
4-byte sequence number
encrypted(response key):
private code text
list of (account name, account index code)
status code (OK or fail, silent alarm, etc.)
MAC The list accounts request allows customers to determine which financial accounts match particular account index codes. This is useful when customers forget which financial accounts and index codes are available.

The GM identifies the customer by the packet's biometric-PIN and retrieves the appropriate information from the customer's record. During registration, the emergency account index code will be given an innocuous-sounding name so that criminals cannot determine which account index code will trigger the emergency notification.

1.5.8. Customer Support and System Administration Messages

The DPC handles additional message types classified as internal messages. The DPC generally does not accept these messages from non-DPC systems. The messages are database vendor specific. However, the internal network uses DES-encrypted packets to provide additional security.

The Customer Service and System Administration tasks are implemented using the database vendor's query language and application development tools.

Customer Service tasks

IBD: find, activate, deactivate, remove, correct records, change PINs.

AID: add or remove authorized individuals.

AOD: find, add, remove, correct records.

VAD: find, activate, deactivate, remove, correct records.

PFD: add, remove, correct records.

System Administration tasks

Run prior fraud checks.

Modify the Valid Site List.

Summarize log information (warnings, errors, etc.).

Modify the PIN Group List.

Performance monitoring.

Run backups.

Crash recovery procedures.

Time synchronization for the DPC sites.

Change the primary registration site.

Change the secret DES encryption key.

Generate a list of BIA hardware identification code, MAC encryption key, and DUKPT Base Key triples. Store on an encrypted floppy for the Key Loading Device.

1.5.9. Firewall Machine 1.5.9.1. Purpose

The FW Machines provide a first line of defense against network viruses and computer hackers. All communication links into or out of the DPC site first pass through a secure FW Machine.

1.5.9.2. Usage

The FW Machine, an Internet-localnet router, only handles messages destined for the GM Machines.

BIA-equipped terminals send packets to a single DPC site via modem, X.25, or other communication medium. The DPC relies on a third party to supply the modem banks required to handle the volume of calls and feed the data onto the DPC backbone.

For DPC to DPC communication, primarily for distributed transactions and sequence number updates, the FW Machines send out double-length DES encrypted packets. The DPC LAN component handles the encryption and decryption: the FWs do not have the ability to decrypt the packets.

1.5.9.3. Security

A properly configured network sniffer acts as an intruder detector as backup for the FW. If an anomalous message is detected, the intruding messages are recorded in their entirety, an operator is alerted, and the FW is physically shut down by the sniffer.

The FW disallows any transmissions from the internal network to the rest of the Internet.

1.5.9.4. Message Bandwidth

A financial authorization request requires about 400 bytes and registration packets require about 2 KB. To handle 1000 access requests per second and 1 registration packet per second, the FW Machines are able to process about 400 KB per second.

Each DPC site requires an aggregate bandwidth of nearly three T1 connections to the third party modem bank and the other DPC sites.

1.5.10. Gateway Machine 1.5.10.1. Purpose

The GM Machine (GM), through the FW Machines, link the outside world (BIA-equipped terminals and other DPCs) to the internal components of the DPC. The DPC has multiple GMs, typically two.

1.5.10.2 Usage

The GM supervises the processing of each BIA request, communicates with the various DPC components as necessary, and sends the encrypted results of the request back to the sender. The software performing this task is called the Message Processing Module.

The GM logs all requests it receives and any warnings from components it communicates with. For example, the GM logs any silent alarms, sequence number gaps, and invalid packets.

Processing a request may require the GM to inform GMs at all other DPCs of a change in the DPC databases. When this happens, the GM runs a distributed transaction to update the remote databases.

Distributed transactions fall into two categories: synchronous and asynchronous. Synchronous distributed transactions require the GM to wait for the distributed transaction to commit before continuing to process the packet. Asynchronous distributed transactions do not require the GM to wait for the commit, and allow it to finish processing the request regardless of whether the distributed transaction commits or not. Asynchronous distributed transactions are only used to update data for which database consistency is not an absolute requirement: sequence numbers and biometric checksum recordings may be performed asynchronously, whereas creating database records, such as Customer Biometric records, may not.

When executing a synchronous distributed transaction, the requesting GM only considers the entire transaction successful if all sites can successfully commit the transaction locally. Otherwise, the GMs back out the changes locally and reject the request due to a transaction error.

The list of valid DPC sites is normally all of the sites. In the case of an extreme site failure, however, a system administrator may manually remove that site from the valid site list. The most likely cause of distributed transaction failures, however, are temporary network failures that are unrelated to any DPC equipment. Requests that require a synchronous distributed transaction cannot be performed until network connectivity is restored or the site is removed from the valid site list. Before a site can be added back to the valid site list, the system administrator brings the site's databases up to date with those of a currently active site.

1.5.10.3. Software Components

Each GM runs the following software components locally for performance reasons:

Message Processing Module

Message Authentication Code Module

Message Decrypt Module

Individual Biometric Database Machine List 1.5.10.4. Message Bandwidth

The message bandwidth required by the GMs is similar to that required by the FW Machines. A 100BaseT Ethernet network interface provides 100 MBits per second and easily covers any bandwidth requirements.

1.5.11 DPC LAN 1.5.11.1 Purpose

The DPC Local Area Network (LAN) links the machines of the DPC sites together using a fiber optic token ring. The fiber optic token ring provides both high bandwidth and good physical security.

1.5.11.2 Security

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

1.5.12 Message Processing Module
1.5.12.1 Purpose

The Message Processing Module (MPM) handles the processing for a request packet. It communicates with other components of the DPC as necessary to perform its tasks. The presence of an MPM on a machine brands it as a GM.

1.5.12.2 Usage

The MPM maintains a request context for each request it is currently processing. The request context includes the information necessary to maintain the network connection to the terminal making the request, the BIA device information, the response key, and the response packet.

1.5.13. Message Authentication Code Module
1.5.13.1. Purpose

The Message Authentication Code Module's (MACM) tasks are to validate the Message Authentication Code on inbound packets and to add a Message Authentication Code to outbound packets.

1.5.13.2. Usage

The MACM maintains an in-memory hash table of 112-bit MAC encryption keys keyed by BIA hardware identification code.

When the MACM receives a request from the GM to validate a packet's MAC, it first looks up the packet's hardware identification code in the hash table. If no entry exists, then the MACM replies to the GM with an "invalid hardware identification code" error.

Otherwise, the MACM performs a MAC check on the BIA message part of the packet using the 112-bit MAC encryption key. If the MAC check fails, then the MACM replies to the GM with an "invalid MAC" error. Otherwise, the MACM replies with a "valid MAC" message.

If the packet contains a bank identification code, the MACM also checks the bank identification code against the owner identification code in the hash table. If the codes don't match, then the MACM replies with an "invalid owner" error.

When the MACM receives a request from the GM to generate a MAC for a packet, it looks up the MAC encryption key using the packet's hardware identification code. With the MAC encryption key, the MACM generates a MAC and adds it to the packet. If the MACM cannot find the hardware identification code in its hash table, it replies with an invalid hardware identification code error instead.

1.5.13.3. Database Schema

The MACM hash table entry contains:
MACM Entry:
hardwareId=int4
ownerId=int4
macEncryptionKey=int16

The table is hashed by hardware identification code.

1.5.13.4. Database Size

Assuming 5 million BIA-equipped devices in service, the hash table requires about 120 MB of storage. For performance reasons, this hash table is cached completely in memory.

1.5.13.5. Dependencies

The MACM only contains records referencing active BIA hardware identification codes and active apparatus owners. Whenever an apparatus or apparatus owner is suspended or deleted from the system, the MACM removes any entries that reference the identification code. When an apparatus is activated, the MACM then adds an entry for it.

The MACM also caches the MAC encryption key from the Valid Apparatus Database. Since the system does not allow the encryption key of a BIA to be changed, the MACM does not need to worry about receiving encryption key updates.

1.5.14. Message Decrypt Module
1.5.14.1. Purpose

The Message Decrypt Module's (MDM) task is to reconstruct the DUKPT transaction key and with it decrypt the biometric-PIN block of the packet. It maintains a list of the DUKPT Base Keys that are required to generate the transaction key.

1.5.14.2. Usage

The MDM constructs the DUKPT transaction key using the packet's sequence number as the DUKPT transaction counter, the upper 22 bits of the BIA hardware identification code as the DUKPT tamper resistant security module (or "TRSM") Identification, and the low 10 bits of the BIA hardware identification code as the DUKPT Key Set Identification.

The DUKPT standard specifies how the transaction key is generated. The Key Set Identification is used to look up a Base Key from the Base Key List. The Base Key is used to transform the TRSM Identification into the initial key via a DES encrypt/decrypt/encrypt cycle. The transaction counter is then applied to the initial key as a series of DES encrypt/decrypt/encrypt cycles to generate the transaction key.

For additional security, two Base Key Lists are maintained, one for low security BIA devices and one for high security devices. The MDM chooses which Base Key List to use depending on the security level of the device.

1.5.14.3. Database Schema

The MDM Base Key List entry contains:
MDM Entry:
baseKey=int16

The Base Key List is indexed by Key Set Identification.

1.5.14.4. Database Size

The MDM maintains an in-memory list of the DUKPT Base Keys. Each key requires 112-bits.

The MDM maintains two sets of 1024 keys requiring 32 KB total.

1.5.14.5. Dependencies

The MDM has no direct dependencies on any other DPC component.

1.5.15. PIN Group List
1.5.15.1. Purpose

The PIN Group List (PGL), in conjunction with the Individual Biometric Database Machine List, defines the configuration of the IBD machines. The PGL stores a list of the PIN groups in the system which is used to simplify the management of the PINs. A PIN group is a set of consecutive PIN codes. A PGL exists on each GM Machine (GM).

1.5.15.2. Usage

The PGL, when given a PIN code, searches through its list of PIN groups for the group containing the PIN code. The PGL maintains the list of groups in order and uses a binary search to quickly find the correct group.

The initial configuration for the PGL is one giant PIN group containing all possible PINs. After a threshold number of PINs are assigned, the giant PIN group is split in two. Thereafter, this process is applied to all succeeding PIN groups.

When a PIN group splits, the PGL assigns a new main and backup IBD machine based on available storage on a first-come-first serve basis. The PGL coordinates with the IBD machines to first copy the affected records from the old main and backup machines to the new ones, update the IML record, and last remove the old main and backup copies. Splitting a PIN group is an involved task. The PGL batches split requests to be run when the DPC is lightly loaded, for instance, at night.

The system administrator may also change the main and backup IBD machines for a given PIN group if the machines' free storage falls below a level required for handling the expected amount of new registrations.

1.5.15.3. Database Schema

The schema for the PIN Group records are:
PINGroup:
lowPin=int8
highPin=int8
used=int4

Each PIN group is identified by a unique identifier. For convenience the PIN group identification code is the lowPin code for the group, however the system does not otherwise rely upon this fact.

The PGL is keyed by the lowPin field.

1.5.15.4. Database Size

The PGL is expected to contain about 3000 groups (each PIN group contains about 1000 active PINs, but may span millions of actual PINs). The entire PGL requires about 72 KB of storage and is cached completely in memory.

1.5.15.5. Dependencies

When PIN groups are added, merged, or split up, the PGL is responsible for informing the IBD Machine List of the changes and for directing the movement of IBD records from one IBD machine to another.

1.5.16. Individual Biometric Database Machine List
1.5.16.1. Purpose

The IBD Machine List (IML), in conjunction with the PIN Group List, codifies the configuration of the IBD machines. The IML maps a PIN code to the main and backup IBD machines storing IBD records for the PIN. The IML is actually keyed by PIN Group (a set of consecutive PIN codes) rather than by customer PINs because this greatly reduces the memory required to store the list. An IML exists on each GM Machine (GM).

1.5.16.2. Usage

When a GM processes a request that requires a biometric identification, the GM finds the IML record keyed by the biometric PIN group. The GM then knows the main and backup IBD machines to use for the biometric identification.

Most IBD records will be customers, who will use the system to access accounts at banks. The rest of the records will be generally associated with people who perform administrative functions such as registration, or customer support.

1.5.16.3. Database Schema

The schema for the IML list entries are:
MachinePair:
pinGroup=int8
main=int2,
backup=int2

The IML is keyed by pinGroup.

1.5.16.4. Database Size

The IML is expected to contain about 3000 entries (the number of PIN Groups). Each MachinePair record is 12 bytes requiring about 36 KB of storage and is cached completely in memory.

1.5.16.5. Dependencies

Any changes in the configuration of the IBD machines are reflected in the IML. In addition, the IML uses PIN groups for its keys so when the PIN Group List gets modified, the IML is also updated.

1.5.17. Sequence Number Module
1.5.17.1. Purpose

The Sequence Number Module's (SNM) primary function is to prevent replay attacks by validating packet sequence numbers. Its secondary task is to minimize the effects of a resubmission attack by informing other SNMs in remote DPC sites of sequence number updates and to periodically update the sequence numbers in the Valid Apparatus Database.

The SNM maintains an in-memory hash table of sequence numbers keyed by BIA hardware identification code codes to allow quick validation of packet sequence numbers.

1.5.17.2. Usage

When the SNM receives a validate request from the GM for a given hardware identification code and sequence number, it looks up the hardware identification code in the hash table. If no entry exists, then the SNM replies to the GM with an "invalid hardware identification code" error.

Otherwise, the SNM checks the given sequence number against the sequence number stored in the hash table entry. If the sequence number is less than or equal to the stored sequence number, the SNM replies with an "invalid sequence number" error. Otherwise, the SNM sets the sequence number in the hash table entry to the given sequence number and replies with a "valid sequence number" message.

From time to time, the SNM may observe a sequence number gap. A sequence number gap occurs when the SNM receives a sequence number that is more than one greater than the sequence number stored in the hash table entry. In other words, a sequence number was skipped. When the SNM discovers a sequence number gap, it replies with a "sequence number gap" message to the GM instead of a "valid sequence number" message. The GM treats the packet as valid, but it also logs a "sequence number gap" warning.

Sequence number gaps usually occur when network connectivity is lost: packets are dropped or can't be sent until the network is restored to working order. However, sequence number gaps occur for fraudulent reasons as well: malicious parties could intercept packets preventing them from arriving at the DPC or they could even attempt to counterfeit packets (with a large sequence number so that it isn't immediately rejected).

The SNM's secondary function is to inform other DPCs of the updated sequence numbers. Quickly updating sequence numbers at all DPC sites thwarts resubmission attacks wherein a malicious entity monitors packets destined for one DPC site and immediately sends a copy to a different DPC site in the hope of exploiting the transmission delay of sequence number updates from one DPC site to another resulting in both sites accepting the packet as valid, when only the first site should accept the packet.

The SNMs send update messages to each other whenever they receive a valid sequence number. If an SNM receives an update message for a sequence number that is less than or equal to the sequence number currently stored in its hash table, that SNM logs a sequence number resubmission warning. All resubmission attacks are detected in this manner.

A simpler way to thwart resubmission attacks completely, is to have only one SNM validate packets. Under this scheme, there is no update transmission delay window to exploit with a resubmission attack. Alternately, multiple SNMs can be active at the same time provided none of them handle sequence number validation for the same BIA-equipped device.

1.5.17.3. Sequence Number Maintenance

When the SNM boots up, it loads the sequence number hash table from the sequence numbers for active BIA stored in the VAD.

Once per day, the SNM downloads the current sequence numbers to the local Valid Apparatus Database (VAD).

The VAD is responsible for sending add-entry and remove-entry messages to the SNMs for any BIA-equipped devices that are activated or deactivated to keep the SNM hash table up-to-date.

1.5.17.4. Database Schema

The SNM hash table entry contains:
SNM Entry:
hardwareId=int4
sequenceNumber=int4
The hash table is keyed by hardwareId.

1.5.17.5. Database Size

Assuming about 5 million BIA-equipped devices in service requires the hash table to be about 40 MB.

1.5.17.6. Dependencies

The SNM depends on the Valid Apparatus Database. When an apparatus is suspended or removed from the database, the SNM removes the corresponding entry. When an apparatus is activated, the SNM creates an entry for it.

1.5.17.7. Message Bandwidth

The SNMs require a transmission bandwidth of about 8 KB per second to handle 1000 update sequence number messages per second. The update sequence number messages is buffered and sent out once per second to minimize the number of actual messages sent.

1.5.18. Apparatus Owner Database

1.5.18.1. Purpose

The Apparatus Owner Database (AOD) stores information on customers or organizations that own one or more BIA-equipped devices. This information is used to double check that the BIA devices are used only by their rightful owners and to allow identification of all BIAs owned by a specific customer or organization.

1.5.18.3. Database Schema

The schema for the Apparatus Owner record is:
ApparatusOwner:
ownerId=int4
name=char50
address=char50
zipCode=char9
status=int1
The status field is one of:
0: suspended
1: active
The Apparatus Owner Database is keyed by ownerId.

1.5.18.4. Database size

The AOD is expected to store about 2 million Apparatus Owner records. Each entry is 130 bytes requiring about 260 MB of storage. The AOD is stored as a hashed file keyed by owner identification code. A copy of the AOD is stored on each GM.

1.5.18.5. Dependencies

When entries are removed or suspended from the AOD, any Valid Apparatus Database records that reference those apparatus owners are marked as suspended. In addition, the MAC Module and the Sequence Number Module remove their entries for the suspended apparatuses.

1.5.19. Valid Apparatus Database

1.5.19.1. Purpose

The Valid Apparatus Database (VAD) is a collection of records representing all of the BIAs that have been manufactured to date. The VAD record contains the Message Authentication Code encryption key for each BIA, as well as an indication of whether a BIA is active, awaiting shipment, or marked as destroyed. In order for a message from a BIA to be decrypted, the BIA must exist and have an active record in the VAD.

1.5.19.2. Usage

When manufactured, each BIA has a unique public identification code. In addition, each BIA is injected with a unique MAC encryption key, and an initial DUKPT key, all of which are entered into the VAD record prior to BIA deployment.

When a BIA is first constructed, it is given a unique hardware identification code. When a BIA is placed in service, its hardware identification code is registered with the system. First, the owner or responsible party of the BIA is entered into the Apparatus Owner Database (AOD). Then, the VAD record is pointed to the AOD record, and the BIA is then set active. Requests from that BIA are accepted by the DPC.

When a BIA enters service, the installing agent performs an attendant security assessment, determining the relative attentiveness the organization pays towards fraud-fighting and the like. Likewise, the geography of the surrounding area is examined; high crime neighborhoods will merit a lower security value, for instance. These values are place in the VAD record for the device. These can change over time.

When a BIA is removed from service, it is marked as inactive, and the link to the AOD record is broken. No communications from that BIA are accepted.

Each BIA type and model has a device security assessment performed on it during its design and construction. This represents the basic ability of the device to resist attempts to monitor the BIA's internal functioning, the ability of the BIA to keep both past and current encryption keys stored on the BIA secret, and the BIA's ability to resist reprogramming by criminals.

The number of failed requests, recent requests, and the average number of requests performed by a given apparatus are recorded in the VAD record, to assist the security factors module in detecting fraudulent requests. Periodically, the recentReqs and the failedReqs fields are cleared.

1.5.19.3. Database Schema

The schema for the Valid Apparatus record is:
Valid Apparatus:
hardwareId=int4
macEncryptionKey=int16
ownerId=int8
mfgDate=time
inServiceDate=time
deviceSecurity=int2
locationSecurity=int2
attendentSkill=int2
failedReqs=int2
recentReqs=int2
avgReqs=int2
status=int1
type=int1
use=int1
Possible values for the status field are:
0: suspended
1: active
2: destroyed Possible values for the type field are (one for each type of terminal):
- 0: ATM
- 1: CRT
- 2: CST
- 3: IT Possible values for the use field are:
- 0: personal
- 1: issuer
- 2: remote The Valid Apparatus Database is keyed by hardware identification code.

1.5.19.4. Database Size

The VAD handles about 200,000 ATM, issuer, and remote Valid Apparatus entries. Each entry is 51 bytes requiring about 255 MB total. The VAD is stored as a hashed file keyed by hardware identification code. A copy of the VAD is stored on each GM.

The number of personal Valid Apparatus entries number in the range of 30 million requiring an additional 1.5 GB of storage.

1.5.19.5. Dependencies

When a VAD record changes status, the MAC Modules and Sequence Number Modules are informed of its change in status. For instance, when an apparatus becomes active, the MACP and SNM adds an entry for the newly active apparatus. When an apparatus becomes inactive, the MACP and SNM remove their entry for the apparatus.

1.5.20. Individual Biometric Database 1.5.20.1. Purpose

Individual Biometric Database (IBD) records store personal information on customers for both identification as well as authentication. This information includes their primary and secondary biometrics, one or more PIN codes, a list of financial accounts, account index codes, account index names, private code, one or more emergency account index codes, address, and phone number. The customer may optionally include this SSN. This information is necessary for identifying a customer either by biometric or personal information, for accessing related information, or for providing an address or phone number to remote banks for additional verification.

1.5.20.2. Usage

Customers are added to the system during the customer enrollment process at registered Customer Registration Terminals located in retail banking establishments worldwide, or in local system offices. During enrollment, customers select their personal identification numbers, and add financial accounts to their biometric and PIN combination.

Customers may be removed from the database due to fraudulent activity reported by any issuing member. If this occurs, the customer's record is moved from the IBD to the Prior Fraud Database (PFD) by an authorized internal systems representative. The biometric Ids for records in the PFD may not be used for records in the IBD.

The IBD exists on multiple machines, each of which is responsible for a subset of the IBD records with a copy of each record stored on two different machines, both for redundancy and for load-sharing. The IBD Machine List, stored on the GM, maintains which machines hold which PINs.

1.5.20.3. Database Schema

The schema for the Customer Biometric record is:
CustomerBiometric:
primaryBiometric=biometric
secondaryBiometric=biometric
biometricid=int4
PIN=char10
phoneNumber=char12
lastName=char24
firstName=char24
middleinitial=char2
SSN=char9
privateCode=char40
address=char50
zipCode=char9
publicKey=char64
checksums=int4[10]
accountIndexCodes=char30[10]
accountIndexNames=char30[10]
emergencyIndexCode=char1
emergencyLink=char1
privs=char10
enroller=int8
silentAlarmCount=int4
silentAlarmBehavior=int2
status=int1

The status field is one of:
- 0: suspended
- 1: active
- 2: priorFraud

The IBD is keyed by PIN.

The silent alarm behavior is a list of mutually non-exclusive options, including "notify authorities", "reject attended account access", "reject unattended account access", "$150 transaction limit", or "present false private code."

1.5.20.4. Database Indexes

Each IBD machine has additional indexes on the customer's Social Security Number, biometric identification code, last name, first name, and phone number to facilitate access to the IBD database.

1.5.20.5. Database Size

Each IBD machine has 40 GB of secondary storage provided by one or more RAID devices. Each IBD record is 2658 bytes, with the biometrics being 1K each, allowing up to 15 million records per machine. The IBD records are stored using a clustered secondary index on the PIN. The index is stored in memory and requires no more than 64 MB; a 64 MB index handles about 16 million entries. To store records for 300 million customers, the DPC needs at least 40 IBD machines: 20 IBD machines for main storage and another 20 for backup. The number of IBD machines is easily scaled up or down depending on the number of registered customers.

1.5.20.6. Dependencies

The IBD machines, PIN Group List, and the IBD Machine List remain up-to-date in terms of which PINs are on which machine. When a PIN group is reconfigured or main and backup machines for PIN groups are changed, the IBD machines update their databases and indexes appropriately.

1.5.21. Authorized Individual Database 1.5.21.1. Purpose

For each issuer or personal BIA-equipped device, the Authorized Individual Database (AID) maintains a list of individuals who are authorized by the owner of the device to use it.

The AID because it provides restricted access to a terminal. For example, the Issuer Terminal can only be used by an authorized bank representative.

1.5.21.2. Database Schema

The schema for the Authorized Individual record is:
Authorized Individual:
hardwareId=int4 biometricId=int4

The hardwareId refers to a record in the Valid Apparatus Database and the biometricId refers to a record in the Individual Biometric Database. Whenever the DPC needs to check whether an individual is authorized to use a personal or issuer BIA device, the DPC checks for the existence of an Authorized Individual record with the correct hardwareId and biometricId.

Personal BIA devices are identified by a use field set to 1 (personal) in the Valid Apparatus Database. Issuer BIA devices are identified by a use field set to 2 (issuer) in the Valid Apparatus Database.

1.5.21.3. Database Size

Assuming each issuer terminal has 10 individuals authorized to use it and an each personal device has two authorized individuals with 1,000,000 personal devices in the server, the AID stores about:

10 * 100,000+2 * 1,000,000=3,000,000 entries

The entire database requires about 24 MB of storage.

1.5.21.4. Dependencies

When Authorized Owner Database records or Valid Apparatus Database records are removed, all Authorized Individual records referencing them are removed.

1.5.22. Prior Fraud Database 1.5.22.1. Purpose

The Prior Fraud Database (PFD) is a collection of records representing customers who have defrauded member issuers at some point in the past. This database allows the DPC to perform a re-registration check on every new registrant quickly, since only a small number of customers will be designated as having defrauded member issuers. The PFD also runs background transactions during periods of low system activity to weed out customers in the IBD who have matching records in the PFD.

The system does not automatically put customers in the PFD, unless it detects that they are attempting to register again. Placing a customer in the PFD is a sensitive policy matter which is outside the scope of this document.

1.5.22.2 Usage

Before a new IBD record is marked as active, the customer's primary and secondary biometrics are checked against each and every biometric in the PFD using the same biometric comparison techniques as those used in the customer identification procedure. If a match is found for the new IBD record, the IBD record's status is designated with a label of "prior fraud," and the GM logs a "registering customer with prior fraud" warning.

It is assumed that the PFD will remain relatively small. The cost to run the PFD is expensive, as it is an involuntary biometric search, so it is important to add only those customers to the PFD who have imposed a significant cost to the system.

1.5.22.3. Database Schema

The schema for the Prior Fraud record is:
Prior Fraud:
primaryBiometric=biometric
secondaryBiometric=biometric
biometricid=int4
PIN=char10
phoneNumber=char12
lastName=char24
firstName=char24
middleinitial=char2
SSN=char9
privateCode=char40
address=char50
zipCode=char9
publicKey=char64
checksums=int4[10]
accountIndexCodes=char30[10]
accountIndexNames=char30[10]
emergencyIndexCode=char1
emergencyLink=char1
privs=char10
enroller=int8
silentAlarmCount=int4
silentAlarmBehavior=int2
status=int1

The status field is one of:
0: suspended
1: active
2: priorFraud

The PFD is keyed by biometric identification code.

1.5.22.4. Database Size

The PFD record is the same as the IBD record. Fortunately, the DPC needs to store many fewer of them so only two database machines are required to store the entire database, of which one is the backup.

1.5.22.5. Dependencies

The PFD does not have any direct dependencies on any other DPC component.

1.5.23. Issuer Database 1.5.23.1. Purpose

The Issuer Database (ID) stores information on banks and other financial institutions that allow their financial accounts to be accessed through the system. For many financial accounts, such as savings or checking accounts, the issuing institutions are the only entities that can add or remove their financial account numbers to a given customer's IBD record.

1.5.23.2. Usage

The DPC uses the ID to validate requests from Issuer Terminals by searching the ID for a record containing the Issuer Terminal's issuer code. The owner Identification stored in the record must match up with the owner stored in the Valid Apparatus Database for the BIA stored in the Issuer Terminal.

The schema for the Issuer record is:
Issuer Record:
issuercode=int6
ownerId=int4
name=char50
phoneNumber=char12
address=char50
zipCode=char9

The Issuer Database is keyed by issuerCode.

1.5.23.3. Database Size

The Issuer Database handles about 100,000 entries. Each entry is 127 bytes requiring less than 2 MB. A copy of the ID is stored on each GM.

1.5.23.4. Dependencies

The Issuer Database does not have any direct dependencies on any other DPC component.

1.5.27. System Performance

The key performance number is how many financial authorization account accesses the DPC handles per second. The tasks required to process an account access along with an estimate of the time cost to complete them follows:

In GM:
1. MACM checks the MAC (local)

2. SNM checks the sequence number (network message)
3. MDM decrypts the biometric-PIN block (local)
4. Find IBD machine (local)
5. Send identify request to the IBD machine (network message)

In IBD machine:
6. Retrieve all IBD records for the PIN (x seeks and x reads, where x is the number of pages required to store the biometric records).
7. For each record, compare against its primary biometric (y/2 ms where y is the number of records retrieved).
8. If no reasonable match, repeat step 9 but compare against the secondary biometric (z * y/2 ms, where y is the number of records retrieved and z is the probability no match is found).
9. Update the best matching IBD record's checksum queue and check for possible replay attacks (1 seek, 1 read, and 1 write).
10. Return the best matching IBD record or an error if the match is not close enough (network message).

In GM:
11. Authorize request with an external processor (network message)
12. GM encrypts and MACs the response (local).
13. Sends response packet back (network message).

Transaction Per Second Estimates:

$$x * (s + r) + y/2 * (1 + z) + s + r + w + 5 * n =$$
$$(x + 1) * (s + r) + y/2 * (1 + z) + w + 5 * n$$

[assume x is 20, y is 30, z is 5%; s = 10 ms, r = 0 ms, w = 0 ms, n = 0 ms]
= 21 * 10 ms + 15 * 1.05 ms
= 226 ms
= 4.4 TPS

[assume x is 10, y is 15, z is 5%; s = 10 ms, r = 0 ms, w = 0 ms, n = 0 ms]
= 11 * 10 ms + 7.5 * 1.05 ms
= 118 ms
= 8.4 TPS

[assume x is 1, y is 1, z is 5%; s = 10 ms, r = 0 ms, w = 0 ms, n = 0 ms]
= 2 * 10 ms + 1/2 * 1.05 ms
= 21 ms
= 47 TPS The backup IBD machine also processes requests doubling effective TPS.

| Customers/PIN | TPS |
|---|---|
| Worst case (with 2 machines in use): | |
| 30 | 8 |
| 15 | 16 |
| 1 | 94 |
| Average case (with 20 machines in use): | |
| 30 | 88 |
| 15 | 168 |
| 1 | 940 |
| Best case (with 40 machines in use): | |
| 30 | 176 |
| 15 | 336 |
| 1 | 1880 |

The above is just an example of one configuration of the system as it could be implemented in a commercially viable manner. However, it is anticipated that this invention can be configured in many other ways which could incorporate the use of faster computers, more computers, and other such changes.

1.6. TERMINAL PROTOCOL FLOWCHART

The following set of protocol flows describe interactions between specific terminals, the DPC, the attached BIA, and other parties such as the credit/debit processor, and so on.

1.6.1. Customer Registration Terminal

In this case, a CRT communicates with a registration BIA and the DPC to register a customer with the system.

```
CRT → BIA Set Language <English>
BIA → CRT OK
CRT → BIA Get Biometric <20> <primary>
    BIA/LCD: <Please place PRIMARY finger on lighted panel>
    Customer places primary finger on scanner
BIA → CRT OK
CRT → BIA Get Biometric <20> <secondary>
    BIA/LCD: <Please place SECONDARY finger on lighted panel>
    Customer places secondary finger on scanner
BIA → CRT OK
CRT → BIA Get Pin <40>
    BIA/LCD: <Please enter your PIN, then press <enter>>
    Customer enters 123456, then <enter>
BIA → CRT OK
CRT → BIA Get Message Key
BIA → CRT <OK <message key>>
BIA → <Registration Request Message>
    CRT/Screen: <Name: >
    Representative enters <Fred G. Shultz>
    CRT/Screen: <Address: >
    Representative enters <1234 North Main>
    CRT/Screen: <Zipcode: >
    Representative enters <94042>
    CRT/Screen: <Private code: >
    Representative queries customer, then enters <I am fully persuaded of it.>
    CRT/Screen: <Financial account list: >
    Representative enters <2, 1001-2001-1020-2011> (credit card)
    Representative enters <3, 1001-1002-0039-2212> (checking account)
    CRT/Screen: <Emergency account index code: >
    Representative enters <1,2> (emergency, credit card)
CRT → Form Message <registration>
BIA → CRT <Registration Request Message>
BIA → CRT OK
    BIA/LCD: <I'm talking to DPC Central>
    CRT appends message-key-encrypted personal information to request
CRT → DPC Registration Request Message> <encrypted personal information>
    DPC: verify PIN 123456
DPC → CRT <Registration Response Message>
CRT → BIA Show response <Registration Response Message> <8>
    BIA/LCD: <Registration ok: I am fully persuaded of it, 123456>
BIA → CRT <OK>
```

1.6.2. Customer Service Terminal

In this case, a CST communicates with a standard BIA and the DPC to verify the identity and the credentials of a customer.

```
CST → BIA Set Language <English>
BIA → CST OK
CST → BIA Get Biometric <20>
    BIA/LCD: <Please place finger on lighted panel>
    Customer places finger on scanner
BIA → CST OK
CST → BIA Get Pin <40>
    BIA/LCD: <Please enter your PIN, then press <enter>>
```

47

```
    Customer enters PIN, then <enter>
BIA → CST OK
CST → BIA Get Message Key
BIA → CST <OK <message key>>
CST → Form Message <Customer identification request>
BIA → CST <Customer identification request>
BIA → CST OK
    BIA/LCD: <I'm talking to DPC Central>
CST → DPC <Customer identification request>
    DPC: get private code, customer's priv
DPC → CST <Customer Identity Response>
CST → BIA Show Response <Customer Identity Response> <8>
    BIA/LCD: <Identity ok: I am fully persuaded of it>
BIA → CST <OK <customer-name priv>>
CST: check priv to see if sufficient for CST use
```

1.6.3. Issuer Terminal

In this case, an IT communicates with a standard BIA and the DPC to authorize and send a batch of account addition and deletion requests to the DPC. The customer's private code is "I am fully persuaded of it", and the bank code is 1200.

```
IT → BIA Set Language <English>
BIA → IT OK
IT → BIA Get Biometric <20>
    BIA/LCD: <Please place finger on lighted panel>
    Customer places finger on scanner
BIA → IT OK
IT → BIA Get Pin <40>
    BIA/LCD: <Please enter your PIN, then press <enter>>
    Customer enters PIN, then <enter>
BIA → IT OK
IT → BIA Assign Register <1> <1200>
BIA → IT OK
IT → BIA Get Message Key
BIA → IT <message key>
BIA → IT OK
IT → BIA Form Message <issuer request>
BIA → IT <Issuer Batch Request>
BIA → IT OK
    BIA/LCD: <I'm talking to DPC Central>
IT → DPC <Issuer Batch Request> <message-key-encrypted issuer batch>
    DPC: validate biometric, validate bank code 1200
        vs. BIA identification
    DPC: get private code
    DPC: decrypt message using message key, execute issuer batch
DPC → IT <Issuer Batch Response>
IT → BIA Show Response <Issuer Batch Response> <8>
    BIA/LCD: <Batch ok: I am fully persuaded of it>
BIA → IT <OK>
```

1.6.4. Automated Teller Machinery

In this case, an ATM communicates with an integrated ATM BIA and the DPC to identify a customer and obtain his financial account number. The customer's financial account is 2100-0245-3778-1201, bank code is 2100, and the customer's private code is "I am fully persuaded of it."

```
ATM → BIA Get Biometric <20>
    ATM/LCD: <Please place finger on lighted panel>
    Customer places finger on scanner
BIA → ATM OK
    ATM/LCD: <Please enter your PIN, then press <enter>>
    Customer enters 123456 on ATM keyboard, then <enter>
ATM → BIA Set Pin <123456>
BIA → ATM OK
    ATM/LCD: <Now enter your account index code, then
    press <enter>>
```

48

```
    Customer enters 2, then <enter>
ATM → BIA Set Account Index Code <2>
BIA → ATM OK
ATM → BIA Assign Register <1> <2100>
BIA → ATM OK
ATM → Form Message <account access request message>
BIA → ATM <Access Request Message>
BIA → ATM OK
    ATM/LED: <I'm talking to DPC Central>
ATM → DPC <Access Request Message>
    DPC: validate biometric, retrieve financial account
        number →2100- 0245-3778-1201
    DPC: get private code
DPC → ATM <Access Response Message>
ATM → BIA Decrypt Response <Access Response Message>
BIA → ATM <2100-0245-3778-1201> <no emergency> <I am fully
persuaded of it>
    ATM/LCD: <I am fully persuaded of it>
```

At this point, the ATM has the financial account number it needs to continue, so it then retrieves the information associated with the financial account number, and commences interacting with the customer.

From the foregoing, it will be appreciated how the objects and features of the invention are met.

First, the invention provides a computer identification system that eliminates the need for a user to possess and present a physical object, such as a token, in order to initiate a system access request.

Second, the invention provides a computer identification system that is capable of verifying a user's identity, as opposed to verifying possession of proprietary objects and information.

Third, the invention verifies the user's identity based upon one or more unique characteristics physically personal to the user.

Fourth, the invention provides an identification system that is practical, convenient, and easy use.

Fifth, the invention provides a system of secured access to a computer system that is highly resistant to fraudulent account accesses by non-authorized users.

Sixth, the invention provides a computer identification system that enables a user to notify authorities that a particular access request is being coerced by a third party without giving notice to the third party of the notification.

Although the invention has been described with respect to a particular tokenless account access system and method for its use, it will be appreciated that various modifications of the apparatus and method are possible without departing from the invention, which is defined by the claims set forth below.

5. GLOSSARY

ACCOUNT INDEX CODE:
 A digit or an alpha-numeric sequence that corresponds to a particular financial account
AID:
 Authorized Individual Database: contains the list of individuals authorized to use personal and issuer BIA devices.
AOD:
 Apparatus Owner Database: central repository containing the geographic and contact information on the owner of each BIA.
ASCII:
 American Standard Code for Information Interchange
ATM:
 Automated Teller Machinery; uses encoded biometric identity information to obtain access to a financial account management system, including cash dispensing and account management.

BIA:

Biometric input apparatus; collects biometric identity information, encodes and encrypts it, and makes it available for authorizations. Comes in different hardware models and software versions.

Biometric:

A measurement taken by the system of some aspect of a customer's physical person.

Biometric ID:

An identifier used by the system to uniquely identify an individual's biometric record (IRID—Individual Record ID)

BIO-PIN GROUP:

A collection of algorithmically dissimilar biometric samples linked to the same personal identification number

CBC:

Cipher Block Chaining: an encryption mode for the DES.

CCD:

Charged-Coupled Device

COMMANDS:

A program or subroutine residing in the DPC that performs a specific task, activated by a request message sent from a BIA-equipped terminal.

CRT:

Customer Registration Terminal; located at retail banking outlets. CRTs combine Customer Registration information with a customer-selected PIN and selected personal information to register customers with the system.

CST:

Customer Service Terminals; provide system customer service personnel with varying degrees of access (based on access privilege) the ability to retrieve and modify information on customers in order to help people with account problems.

DATA SEALING:

The encrypted checksumming of a message that allows information to remain in plain text while at the same time providing a means for detecting any subsequent modification of the message.

DES:

Data Encryption Standard: a standard for the cryptographic protection of digital data. See standard ANSI X3.92-1981

DPC:

A data processing center, namely, the place and the entity where the hardware, software, and personnel are located with the goal of supporting a multigigabyte biometric identity database. A DPC processes electronic messages, most of which involve performing biometric identity checks as a precursor to accessing an account.

DSP:

Digital Signal Processor: a class of integrated circuits that specialize in the mathematical operations required by the signal processing applications.

DUKPT:

Derived Unique Key Per Transaction: See standard ANSI/ABA X9.24-1992

EMERGENCY ACCOUNT INDEX CODE:

The alpha-numeric digit or sequence selected by a customer which, when accessed, will result in an account access being labelled by the system as an emergency account access, potentially causing the display of false screens and/or the notification of authorities that the customer has been coerced into performing an account access.

FAR (False Accept Rate):

The statistical likelihood that one customer's biometric will be incorrectly identified as the biometric of another customer.

FALSE SCREENS:

Displays of information which has been intentionally pre-determined to be subtly inaccurate such that a coercing party will not illegally obtain accurate data about a customer's financial accounts, all the while remaining unaware of the alteration of the information.

FDDI:

Fiber Digital Device Interface: a networking device that utilizes a fiber optic token ring.

FS:

Field Separator

FW:

Firewall Machine: the Internet-local net router that regulates traffic into and out of the DPC.

GM:

Gateway Machine: the main processing computers in the DPC; runs most of the software.

IBD:

Individual Biometric Database: central repository for biometric, financial account, and other personal information. Queries against the biometric database are used to verify identity for account accesses.

ID:

Issuer Database: central repository containing the institutions that are allowed to add and delete financial account numbers with the system.

IML:

IBD Machine List: a software module in the DPC determines which IBD machines are responsible for which PIN codes.

ISSUER:

A financial account issuer for financial assests to be registered with the DPC.

ISSUER BATCH:

A collection of "add" and "delete" instructions complete with biometric IDs, financial accounts, and account index codes verified and submitted by an issuer to the DPC.

IT:

Issuer Terminals; provides a batch connection to the system for issuers to add and remove (their own) financial account numbers from specific customer's IBD records.

LCD:

Liquid Crystal Display: a technology used for displaying text.

MAC:

Message Authentication Code: an encrypted checksum algorithm, the MAC provides assurance that the contents of a message have not been altered subsequent to the MAC calculation. See standard ANSI X9.9-1986

MACM:

Message Authentication Code Module: a software module in the DPC that handles MAC validation and generation for inbound and outbound packets.

MDM:

Message Decrypt Module: a software module in the DPC that encrypts and decrypts packets from or destined to a BIA device.

MPM:

Message Processing Module: a software module in the DPC that performs the processing of request packets.

PFD:

Prior Fraud Database: central repository for IBD records which have had prior fraud associated with them. During registration, every new applicant's biometrics are checked to see if a re-registration is occuring against all PFD records with the intent of reducing recidivism.

PGL:
PIN Group List: a software module in the DPC that is responsible for maintaining the configuration of the IBD machines.

PIN:
Personal identification number; a password formed from either numbers, symbols, or alphabetic characters that only the rightful account owner is supposed to know.

RAM:
Random Access Memory

RF:
Radio Frequency: generally refers to radio frequency energy emitted during the normal operation of electrical devices.

REGISTERS:
Memory reserved for a specific purpose, data set aside on chips and stored operands to instructions REQUESTS:
Electronic instructions from the BIA to DPC instructing the DPC to identify the customer and thereby process the customer's command in the event the identication is successful SNM:
Sequence Number Module: a software module in the DPC that handles the DUKPT sequence number processing for inbound request packets. Sequence number processing protects against replayattacks.

Terminal:
A device that uses the BIA to collect biometric samples and form request messages that are subsequently sent to the DPC for authorization and execution. Terminals almost always append ancillary information to request messages, identifying counterparties and the like.

Token:
An inanimate object conferring a capability.

VAD:
Valid Apparatus Database: central repository in which each BIA (with associated unique encryption codes) is identified, along with the owner of the BIA.

What is claimed is:

1. A method for tokenless access to financial accounts provided by various institutions, the method comprising the steps of:

a. a customer registration step, wherein a customer registers with a computer system a PIN, one or more registration biometric samples, and one or more customer financial accounts;

b. an initiation step, wherein the customer initiates an account access at an ATM by entering the customer's personal authentication information comprising a PIN and at least one bid biometric sample, wherein no portable man-made memory devices such as smart-cards or swipe cards are used;

c. a transmission step, wherein an account access request message comprising the personal authentication information is forwarded from the ATM to the computer system;

d. a customer identification step, wherein the computer system compares the personal authentication information in the account access request message with the registration biometric samples to produce either a successful or failed identification of the customer;

e. an account retrieval step, wherein upon successful identification of the customer, a financial account number of the customer is retrieved; and f. an access step, wherein after successful identification of the customer and successful financial account number retrieval, the customer is allowed to access the customer financial account.

2. The method of claim 1 wherein the customer identification step is accomplished preferably in less than about 2 seconds, whereby the entire authorization of access is completed within a commercially acceptable timeframe.

3. The method of claim 1 further comprising a financial operation step, wherein the customer performs at least one action selected from the group comprising: obtaining cash, depositing funds, transferring funds between accounts, obtaining account balances, paying bills, and obtaining electronic cash.

4. The method of claim 1 further comprising a computer system authentication step wherein a private code, distinct from the PIN and not used to gain access to the computer system, is gathered from the customer during the customer registration step and is presented to only the customer during a presentation step, whereby the customer is assured that the authentic computer system was used to process the account access because a false computer system would not be able to present the customer's private code.

5. The method of claim 1 wherein:

a. the customer registration step further comprises assigning an account index code to each customer financial account, wherein the account index code further comprises one or more alphanumeric characters;

b. an account specification step, wherein the customer enters an account index code;

c. the transmission step further comprises including the account index code in the account access request message; and d. the account retrieval step further comprises the computer system retrieving the customer financial account number using the account index code from the account access request message.

6. The method of claim 5 wherein the registration step further comprises assigning an account index name to an account index code.

7. The method of claim 6 further comprising an account name display step, wherein a list of accounts with their account index names is retrieved and displayed to the customer after a successful identification.

8. The method of claim 5 wherein during the customer registration step, the customer registers an emergency account index code, which if entered by the customer during the initiation step in place of the account index code, triggers a silent alarm, whereby authorities are notified of a coerced account access.

9. The method of claim 8 wherein during the registration step, the customer specifies any combination of actions taken upon the triggering of the silent alarm, comprising artificial financial resource limits, presentation of a false private code, rejection of the account access, dispensing marked bills, notifying the authorities, or the sending of the silent alarm to the institution.

10. The method of claim 1 wherein the customer registers an emergency PIN during the registration step which, if entered by the customer during the initiation step in place of his PIN, triggers a silent alarm.

11. The method of claim 10 wherein during the registration step, the customer specifies any combination of actions taken upon the triggering of the silent alarm, comprising artificial financial resource limits, presentation of a false private code, rejection of the account access, dispensing marked bills, notifying the authorities, or the sending of the silent alarm to the institution.

12. The method of claim 1 wherein the ATM is remote from the institution and communicates with the institution using a computer network.

13. The method of claim 12 wherein the computer network is one or more of the group comprising an ATM network, the Internet, a private intranet, a telephone network, or a cable TV network.

14. The method of claim 1 wherein communications with the computer system are encrypted.

15. The method of claim 1 wherein the customer registration step further comprises comparing the customer's registration biometric samples to previously designated biometric samples of certain customers wherein if a match occurs, the customer is determined to have re-registered, whereby customers who have perpetrated fraud on the system can be automatically identified from their biometrics alone when they re-register.

16. The method of claim 15 wherein the registration step further comprises collecting the biometric samples from a specific finger, such as the index finger, whereby the system can detect re-registrations of previously designated biometric samples of certain customers.

17. The method of claim 1 wherein the biometric sample is selected from the set of a fingerprint, a retinal image, or a voice print.

18. The method of claim 1 further comprising a biometric theft resolution step, wherein the PIN of the customer is changed to prevent unauthorized access by individuals who have obtained the customer's personal authentication information.

19. The method of claim 1 wherein the ATM comprises an application executing on a personal computer.

20. A method for tokenless access to financial accounts provided by various institutions, for selecting from among different financial accounts, the method comprising the steps of:
   a. a customer registration step, wherein a customer registers with a computer system a PIN, one or more registration biometric samples, one or more customer financial accounts, and assigns an account index code to each customer financial account;
   b. an initiation step, wherein the customer initiates an account access at an ATM by entering the customer's personal authentication information comprising a PIN and at least one bid biometric sample, wherein no portable man-made memory devices such as smartcards or swipe cards are used;
   c. an account specification step, wherein the customer enters an account index code;
   d. a transmission step, wherein an account access request message comprising the personal authentication information and the account index code is forwarded from the ATM to the computer system;
   e. a customer identification step, wherein the computer system compares the personal authentication information in the account access request message with the registration biometric samples to produce either a successful or failed identification of the customer;
   f. an account retrieval step, wherein upon successful identification of the customer, a financial account number of the customer is retrieved using the account index code from the account access request message; and
   g. an access step, wherein after successful identification of the customer and successful financial account number retrieval, the customer is allowed to access the customer financial account.

21. The method of claim 20 wherein the customer identification step is accomplished preferably in less than about 2 seconds, whereby the entire authorization of access is completed within a commercially acceptable timeframe.

22. The method of claim 20 further comprising a financial operation step, wherein the customer performs at least one action selected from the group comprising: obtaining cash, depositing funds, transferring funds between accounts, obtaining account balances, paying bills, and obtaining electronic cash.

23. The method of claim 20 further comprising a computer system authentication step wherein a private code, distinct from the PIN and not used to gain access to the computer system, is gathered from the customer during the customer registration step and is presented to only the customer during a presentation step, whereby the customer is assured that the authentic computer system was used to process the account access because a false computer system would not be able to present the customer's private code.

24. A method for tokenless access to financial accounts provided by various institutions, with an emergency PIN that generates a silent alarm, the method comprising the steps of:
   a. a customer registration step, wherein a customer registers with a computer system a PIN, one or more registration biometric samples, one or more customer financial accounts, and an emergency PIN;
   b. an initiation step, wherein the customer initiates an account access at an ATM by entering the customer's personal authentication information comprising a PIN and at least one bid biometric sample, wherein no portable man-made memory devices such as smartcards or swipe cards are used;
   c. a transmission step, wherein an account access request message comprising the personal authentication information is forwarded from the ATM to the computer system;
   d. a customer identification step, wherein the computer system compares the personal authentication information in the account access request message with the registration biometric samples to produce either a successful or failed identification of the customer;
   e. an emergency check step, wherein the PIN entered by the customer during the initiation step is compared with the emergency PIN, and if they match, a silent alarm is generated;
   f. an account retrieval step, wherein upon successful identification of the customer, a financial account number of the customer is retrieved; and
   g. an access step, wherein after successful identification of the customer and successful financial account number retrieval, the customer is allowed to access the customer financial account.

25. A method for tokenless access to financial accounts provided by various institutions with detection of re-registration, the method comprising the steps of:
   a. a customer registration step, wherein a customer registers with a computer system a PIN, one or more registration biometric samples, and one or more customer financial accounts, wherein the customer's registration biometric samples are compared to previously designated biometric samples of certain customers wherein if a match occurs, the customer is determined to have re-registered, whereby customers who have perpetrated fraud on the system can be automatically identified from their biometrics alone when they re-register;
   b. an initiation step, wherein the customer initiates an account access at an ATM by entering the customer's personal authentication information comprising a PIN and at least one bid biometric sample, wherein no portable man-made memory devices such as smartcards or swipe cards are used;

c. a transmission step, wherein an account access request message comprising the personal authentication information is forwarded from the ATM to the computer system;

d. a customer identification step, wherein the computer system compares the personal authentication information in the account access request message with the registration biometric samples to produce either a successful or failed identification of the customer;

e. an account retrieval step, wherein upon successful identification of the customer, a financial account number of the customer is retrieved; and f. an access step, wherein after successful identification of the customer and successful financial account number retrieval, the customer is allowed to access the customer financial account.

26. A system for tokenless access to financial accounts provided by various institutions, comprising:

a. means for customer registration, wherein a customer registers with a computer system a PIN, one or more registration biometric samples, and one or more customer financial accounts;

b. an ATM wherein the customer initiates an account access by entering the customer's personal authentication information comprising a PIN and at least one bid biometric sample, wherein no portable man-made memory devices such as smartcards or swipe cards are used;

c. means for transmission, wherein an account access request message comprising the personal authentication information is forwarded from the ATM to the computer system;

d. means for identification of the customer, wherein the computer system compares the personal authentication information in the account access request message with the registration biometric samples to produce either a successful or failed identification of the customer;

e. means for account retrieval, wherein upon successful identification of the customer, a financial account number of the customer is retrieved; and wherein after successful identification of the customer and successful financial account number retrieval, the customer is allowed to access the customer financial account.

27. The system of claim 26 wherein the customer performs at least one action selected from the group comprising: obtaining cash, depositing finds, transferring finds between accounts, obtaining account balances, paying bills, and obtaining electronic cash.

28. The system of claim 26 further comprising means for authenticating that the correct computer system was accessed, wherein a private code, distinct from the PIN and not used to gain access to the computer system, is gathered from the customer during the customer registration and is presented to only the customer after customer is allowed accesses, whereby the customer is assured that the authentic computer system was used to process the account access because a false computer system would not be able to present the customer's private code.

29. The system of claim 26 further comprising means for assigning an account index code to each customer financial account.

30. The system of claim 29 further comprising means for including the account index code in the account access request message; wherein after the customer enters an account index code; the computer system retrieves the customer financial account number using the account index code from the account access request message.

31. The system of claim 30 further comprising means for triggering a silent alarm, whereby authorities are notified of a coerced account access, if an emergency account index code is entered by the customer, in place of the account index code.

32. The system of claim 26 further comprising means for customer registration of an emergency PIN which if entered in place of the customer's PIN, triggers a silent alarm.

33. The system of claim 26 wherein the ATM is remote from the institution and communicates with the institution using a computer network.

34. The system of claim 33 wherein the computer network is one or more of the group comprising an ATM network, the Internet, a private intranet, a telephone network, or a cable TV network.

35. The system of claim 26 wherein communications with the computer system are encrypted.

36. The system of claim 26 further comprising means for comparing the customer's registration biometric samples to previously designated biometric samples of certain customers wherein if a match occurs, the customer is determined to have re-registered, whereby customers who have perpetrated fraud on the system can be automatically identified from their biometrics alone when they re-register.

37. A system for tokenless access to financial accounts provided by various institutions with means for detection of re-registration, comprising:

a. means for customer registration, wherein a customer registers with a computer system a PIN, one or more registration biometric samples, and one or more customer financial accounts;

b. means for comparison of the registration biometric samples to a subset of previously registered biometric samples of certain customers wherein if a match occurs, the customer is determined to have re-registered, whereby customers who perpetrate fraud on the system can be automatically identified from their biometrics alone;

c. an ATM wherein the customer initiates an account access by entering the customer's personal authentication information comprising a PIN and at least one bid biometric sample, wherein no portable man-made memory devices such as smartcards or swipe cards are used;

d. means for transmission, wherein an account access request message comprising the personal authentication information is forwarded from the ATM to the computer system;

e. means for identification of the customer, wherein the computer system compares the personal authentication information in the account access request message with the registration biometric samples to produce either a successful or failed identification of the customer;

f. means for account retrieval, wherein upon successful identification of the customer, a financial account number of the customer is retrieved; and wherein after successful identification of the customer and successful financial account number retrieval, the customer is allowed to access the customer financial account.

38. A system for tokenless access to financial accounts provided by various institutions, with an emergency PIN that generates a silent alarm, comprising:

a. means for customer registration, wherein a customer registers with a computer system a PIN, one or more registration biometric samples, one or more customer financial accounts; and an emergency PIN, b. an ATM wherein the customer initiates an account access by entering the customer's personal authentication information comprising a PIN and at least one bid biometric sample, wherein no portable man-made memory devices such as smartcards or swipe cards are used;

c. means for transmission, wherein an account access request message comprising the personal authentication information is forwarded from the ATM to the computer system;

d. means for identification of the customer, wherein the computer system compares the personal authentication information in the account access request message with the registration biometric samples to produce either a successful or failed identification of the customer;

e. means for comparison of the PIN in the access request message to emergency PIN registered by the customer, wherein if they match, a silent alarm is generated;

f. means for account retrieval, wherein upon successful identification of the customer, a financial account number of the customer is retrieved; and wherein after successful identification of the customer and successful financial account number retrieval, the customer is allowed to access the customer financial account.

* * * * *